(12) United States Patent
Goffe

(10) Patent No.: US 9,764,287 B2
(45) Date of Patent: Sep. 19, 2017

(54) BINARY CATALYST BASED SELECTIVE CATALYTIC REDUCTION FILTER

(71) Applicant: Randal A. Goffe, Everett, WA (US)

(72) Inventor: Randal A. Goffe, Everett, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 14/935,199

(22) Filed: Nov. 6, 2015

(65) Prior Publication Data

US 2017/0128882 A1    May 11, 2017

(51) Int. Cl.
*B01D 53/94*     (2006.01)
*B01J 29/06*     (2006.01)
(Continued)

(52) U.S. Cl.
CPC .......... *B01D 53/945* (2013.01); *B01J 21/066* (2013.01); *B01J 23/10* (2013.01); *B01J 23/40* (2013.01);
(Continued)

(58) Field of Classification Search
CPC ..... F01N 3/023; F01N 3/035; B01D 53/9413; B01D 46/2451; B01D 46/2418; B01D 53/94; B01J 35/04; B01J 23/40; B01J 23/10; B01J 29/46; B01J 27/224; B01J 29/06
See application file for complete search history.

(56) References Cited

U.S. PATENT DOCUMENTS

| 858,904 A | 7/1907 | Ostwald |
| 3,730,691 A * | 5/1973 | Lang et al. ........ B01D 53/9472 422/171 |

(Continued)

FOREIGN PATENT DOCUMENTS

| CN | 105363497 A | 3/2016 |
| EP | 1945356 A1 * | 7/2008 ......... B01D 46/0001 |

(Continued)

OTHER PUBLICATIONS

Koebel, M., and E.O. Strutz, "Thermal and Hydrolytic Decomposition of Urea for Automotive Selective Catalytic Reduction Systems: Thermochemical and Practical Aspects," Industrial and Engineering Chemistry Research 42(10)2093-2100, May 2003.

(Continued)

*Primary Examiner* — Timothy Vanoy
(74) *Attorney, Agent, or Firm* — Christensen O'Connor Johnson Kindness PLLC

(57) ABSTRACT

Catalytic cores for a wall-flow filter include juxtaposed channels extending longitudinally between an inlet side and an outlet side of the core, wherein the inlet channels are plugged at the outlet side and outlet channels are plugged at the inlet side. Longitudinal walls forming the inlet and outlet channels separate the inlet channels from the outlet channels. The walls include pores that create passages extending across a width of the walls from the inlet channels to the outlet channels. Catalysts are distributed across the width and length of the walls within internal surfaces of the pores in a manner such that the loading of each catalyst across the width varies by less than 50% from an average loading across the width.

29 Claims, 19 Drawing Sheets

(51) Int. Cl.
| B01J 27/224 | (2006.01) |
| B01J 29/46 | (2006.01) |
| B01J 21/06 | (2006.01) |
| B01J 23/10 | (2006.01) |
| B01J 23/40 | (2006.01) |
| B01J 35/04 | (2006.01) |
| B01D 46/00 | (2006.01) |

(52) U.S. Cl.
CPC .............. *B01J 27/224* (2013.01); *B01J 29/06* (2013.01); *B01J 29/46* (2013.01); *B01J 35/04* (2013.01); *B01D 2255/407* (2013.01); *B01D 2255/504* (2013.01); *B01D 2255/9155* (2013.01)

(56) References Cited

U.S. PATENT DOCUMENTS

| 4,711,871 | A | 12/1987 | Wachs et al. | |
| 4,929,581 | A * | 5/1990 | Steinwandel | B01D 53/944 423/213.5 |
| 5,149,512 | A | 9/1992 | Li et al. | |
| 6,475,944 | B1 | 11/2002 | Yang et al. | |
| 6,826,906 | B2 * | 12/2004 | Kakwani | B01D 53/9409 60/286 |
| 7,078,004 | B2 * | 7/2006 | Voss | B01D 53/9454 423/212 |
| 7,229,597 | B2 | 6/2007 | Patchett et al. | |
| 7,902,107 | B2 | 3/2011 | Patchett et al. | |
| 7,998,423 | B2 | 8/2011 | Boorse et al. | |
| 8,017,543 | B2 * | 9/2011 | Andy | B01D 46/0001 428/116 |
| 8,119,088 | B2 | 2/2012 | Boorse et al. | |
| 8,501,132 | B2 | 8/2013 | Fu et al. | |
| 8,568,675 | B2 | 10/2013 | Deeba et al. | |
| 8,667,785 | B2 | 3/2014 | Blakeman et al. | |
| 8,679,434 | B1 | 3/2014 | Li et al. | |
| 8,828,900 | B2 | 9/2014 | Takagi et al. | |
| 8,989,637 | B2 | 3/2015 | Yoshii | |
| 9,005,559 | B2 | 4/2015 | Sumiya et al. | |
| 9,034,269 | B2 | 5/2015 | Hilgendorff et al. | |
| 2006/0057046 | A1* | 3/2006 | Punke | B01D 53/944 423/215.5 |
| 2010/0172828 | A1 | 7/2010 | Althoff et al. | |
| 2010/0180580 | A1 | 7/2010 | Boorse et al. | |
| 2011/0142737 | A1 | 6/2011 | Seyler et al. | |
| 2011/0250114 | A1 | 10/2011 | Augustine et al. | |
| 2012/0058034 | A1 | 3/2012 | Ogunwumi et al. | |
| 2012/0121486 | A1* | 5/2012 | Collier | B01J 23/30 423/213.5 |
| 2012/0230881 | A1* | 9/2012 | Boger | B01D 46/2474 422/187 |
| 2013/0102819 | A1 | 4/2013 | Szesni et al. | |
| 2013/0121902 | A1 | 5/2013 | Adelmann et al. | |
| 2014/0041366 | A1 | 2/2014 | Seyler et al. | |
| 2014/0044627 | A1 | 2/2014 | Siani et al. | |
| 2014/0140909 | A1 | 5/2014 | Qi et al. | |
| 2014/0193746 | A1 | 7/2014 | Cerri et al. | |
| 2014/0227155 | A1* | 8/2014 | Phillips | B01D 53/9418 423/212 |
| 2015/0017075 | A1* | 1/2015 | Jinbo | C04B 41/85 422/180 |
| 2015/0209766 | A1 | 7/2015 | Xavier et al. | |
| 2015/0360212 | A1 | 12/2015 | Chandler et al. | |
| 2016/0040576 | A1 | 2/2016 | Chandler et al. | |
| 2016/0045868 | A1 | 2/2016 | Sonntag et al. | |
| 2016/0074809 | A1 | 3/2016 | Goffe | |
| 2016/0074839 | A1 | 3/2016 | Goffe | |
| 2016/0136617 | A1 | 5/2016 | Nazarpoor et al. | |
| 2016/0214086 | A1* | 7/2016 | Ano | B01J 23/42 |
| 2016/0339389 | A1 | 11/2016 | Hoke et al. | |
| 2016/0346765 | A1 | 12/2016 | Nazarpoor et al. | |

FOREIGN PATENT DOCUMENTS

| GB | 2504024 B | 3/2014 |
| WO | 2008/094889 A1 | 8/2008 |
| WO | 2012/059144 A1 | 5/2012 |
| WO | 2014027207 A1 | 2/2014 |

OTHER PUBLICATIONS

Köster, K., et al., "Regeneration of Hemofiltrate by Anodic Oxidation of Urea," Artificial Organs 7(2):163-168, May 1983.
Patzer II, J.F., et al., "Urea Oxidation Kinetics via Cyclic Voltammetry: Application to Regenerative Hemodialysis," Bioelectrochemistry and Bioenergetics 276(3):341-353, Dec. 1989.
Patzer II, J.F., et al., "Voltage Polarity Relay—Optimal Control of Electrochemical Urea Oxidation," IEEE Transactions on Biomedical Engineering 38(11):1157-1162, Nov. 1991.
Yao, S.J., et al., "Anodic Oxidation of Urea and an Electrochemical Approach to De-ureation," Nature 241(5390):471-472, Feb. 1973.
Conway, R., et al., "Demonstration of SCR on a Diesel Particulate Filter System on a Heavy Duty Application," SAE Technical Paper 2015-01-1033, Apr. 14, 2015, Abstract.
Devarakonda, M.N., et al., "Technical Challenges in the Integration of DPF and SCR Aftertreatment—Review From a Systems and Modeling Perspective," 12th DOE Cross-Cut Workshop on Lean Exhaust Emissions Reduction Simulations [CLEERS], Apr. 28-30, 2009, Dearborn, Mich., Abstract, 1 page.
Devarakonda, M.N., et al., "Technical Challenges in the Integration of DPF and SCR Aftertreatment on a Single Substrate—Review From a Systems and Modeling Perspective," presented by Maruthi N. Devarakonda at 12th DOE Cross-Cut Workshop on Lean Exhaust Emissions Reduction Simulations [CLEERS], Apr. 28-30, 2009, Dearborn, Mich., Apr. 29, 2009, 22 pages.
"Engine Aftertreatment Systems: Operator's Manual," No. Y53-1090C, PACCAR Inc, Bellevue, Wash., 2011, 42 pages.
Geisselmann, A., "Future Aftertreatment Concepts for Heavy Duty Application," Abstract in SAE 2014 Heavy Duty Diesel Emissions Control Symposium, Event Guide, Gothenburg, Sweden, Sep. 17-18, 2014, p. 25.
Goffe, R.A., and D.M. Mason, "Electrocatalytic Oxidation of Hydrocarbons on a Stabilized-Zirconia Electrolyte Employing Gold or Platinum Electrodes," Journal of Applied Electrochemistry 11(4):447-452, Jul. 1981.
Kwak, J.H., et al., "Effects of Hydrothermal Aging on $NH_3$-SCR Reaction Over Cu/Zeolites," Journal of Catalysis 287(1):203-209, Mar. 2012.
Kwak, J.H., et al., "Excellent Activity and Selectivity of Cu-SSZ-13 in the Selective Catalytic Reduction of NO(x) and $NH_3$," Journal of Catalysis 275(2):187-190, Oct. 2010.
Rappé, K.G., "Combination and Integration of DPF-SCR Aftertreatment Technologies," presented by Kenneth G. Rappé at Annual Merit Review and Peer Evaluation, May 16, 2012, 24 pages.
Rappé, K.G., and G.D. Maupin, "III.6 Integration of DPF & SCR Technologies for Combined Soot and NO(x) After-Treatment," Advcanced Combustion Engine R&D, FY 2014 Annual Report, Pacific Northwest National Laboratory, Richland, Wash., pp. III-30-III-33.
Rappé, K.G., et al., "Combination & Integration of DPF-SCR Aftertreatment," presented by Kenneth G. Rappé at Directions in Engine-Efficiency and Emissions Research Conference [DEER 2001], Detroit, Mich., Oct. 5, 2011, 18 pages.
Rappé, K.G., et al., "Combination & Integration of DPF-SCR Aftertreatment," presented by Kenneth G. Rappé at Directions in Engine-Efficiency and Emissions Research Conference [DEER 2012], Dearborn, Mich., Oct. 18, 2012, 34 pages.
Rappé, K.G., et al., "Combination and Integration of DPF-SCR Aftertreatment Technologies," presented by Darrell R. Herling at the DOE Annual Merit Review and Peer Evaluation, Arlington, Va., May 11, 2011, 24 pages.
Rappé, K.G., et al., "Combination and Integration of DPF-SCR Aftertreatment Technologies," presented by Darrell R. Herling at the DOE Annual Merit Review and Peer Evaluation, Washington, D.C., Jun. 9, 2010, 16 pages.

(56) References Cited

OTHER PUBLICATIONS

Rappé, K.G., et al., "II.B.12 Combination and Integration of DPF-SCR After-Treatment," Advanced Combustion Engine R&D, FY 2011 Annual Report, Pacific Northwest National Laboratory, Richland, Wash., pp. 227-230.

Storey, J.M.E., et al., "Characterization of Urea Decomposition Products in Selective Catalytic Reduction Catalyst Systems," Abstracts of Papers of the American Chemical Society, Washington, D.C., 2011, vol. 242, 2 pages.

Ye, Q., et al., "Activity, Propene Poisoning Resistance and Hydrothermal Stability of Copper Exchanged Chabazite-Like Zeolite Catalysts for SCR of NO With Ammonia in Comparison to Cu/ZSM-5," Applied Catalysis A: General 427-428:24-34, Jun. 2012.

International Search Report and Written Opinion mailed Mar. 30, 2017, issued in corresponding PCT/US2016/060583, filed Nov. 4, 2016, 7 pages.

Office Action mailed Dec. 1, 2016, from related U.S. Appl. No. 14/934,955, filed Nov. 6, 2015, 20 pages.

Office Action mailed Dec. 16, 2016, from related U.S. Appl. No. 14/935,001, filed Nov. 6, 2015, 7 pages.

Office Action mailed Jan. 23, 2017, from related U.S. Appl. No. 14/935,048, filed Nov. 6, 2015, 20 pages.

\* cited by examiner

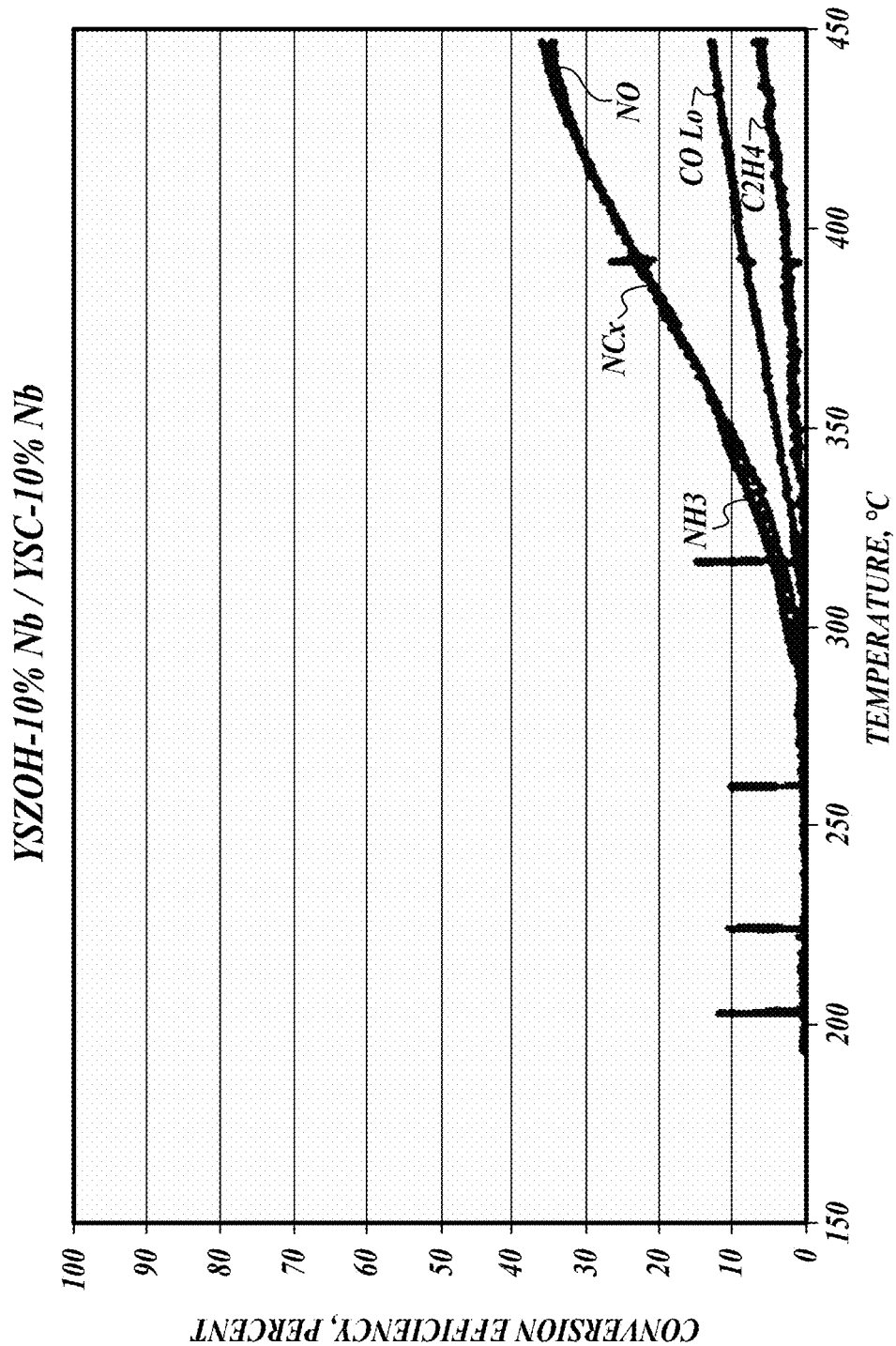

BINARY CATALYST BASED SELECTIVE CATALYTIC REDUCTION FILTER

BACKGROUND

Regulatory air pollution limits for diesel engines have caused heavy duty diesel truck manufacturers to adopt engine aftertreatment systems for treating diesel exhaust gases before release into the atmosphere. An aftertreatment system can include a plurality of catalytic units to reduce pollutants, including particulate soot (unburned hydrocarbons) and nitrogen oxide (NOx).

FIG. 1 shows a prior art aftertreatment exhaust system for a heavy duty diesel truck includes, among other components, a diesel particulate filter system 114 and a selective catalytic reduction system 116. The function of the diesel particulate filter system 114 is to reduce the particulates (soot), and the function of the selective catalytic reduction system 116 is to reduce nitrogen oxide.

The diesel particulate filter system 114 includes both a diesel particulate filter 108 and a diesel oxidation catalyst unit 106 ahead of the diesel particulate filter 108. The diesel particulate filter 108 traps particulates from the exhaust gas on a highly porous ceramic core, also referred to as a wall-flow filter. The filter 108 can undergo regeneration to convert the soot into carbon dioxide through chemical oxidation with an oxidant species. Heavy duty diesel truck manufacturers typically select nitrogen dioxide as opposed to oxygen to oxidize the soot, since oxidization with nitrogen dioxide generally proceeds at a lower temperature. However, while the exhaust gas generally includes a large amount of oxygen, the amount of nitrogen dioxide is relatively small. Accordingly, the diesel oxidation catalyst 106 can be used to convert nitrogen monoxide into nitrogen dioxide. In addition, the diesel oxidation catalyst unit 106 is used to remove residual hydrocarbons (HC) and convert carbon monoxide into carbon dioxide.

The exhaust gases, including the nitrogen dioxide from the diesel oxidation catalyst, pass into the diesel particulate filter 108, which traps soot. In addition to trapping soot, the diesel particulate filter 108 can include a catalyst to catalyze the oxidation of the soot with the nitrogen dioxide in a process of passive regeneration. Under some circumstances, the temperature of the exhaust gas alone may not be sufficient to initiate the oxidation reaction in passive regeneration. Accordingly, the temperature may be increased by using the hydrocarbon doser 104 to dose diesel fuel into the exhaust gases to raise the temperature and initiate oxidation, which is known as active regeneration.

The selective catalytic reduction system 112 includes a diesel exhaust fluid doser 110 and a selective catalytic reduction unit 112. The function of the selective catalytic reduction unit 112 is to convert NOx species into nitrogen ($N_2$) and water through chemical reduction with a reductant species. The reductant species is usually ammonia. Ammonia is generated upon decomposition of urea, which is dosed as a solution via the diesel exhaust fluid doser 110. The selective catalytic reduction unit 112 can include a flow-through ceramic core loaded with a catalyst.

There have been attempts to reduce the components of the aftertreatment system by combining the functions of the diesel particulate filter 108 and the selective catalytic reduction unit 112 into a single unit, i.e., a diesel particulate filter with selective catalytic reduction capability. A diesel particulate filter that has capability for selective catalytic reduction of NOx is sometimes referred to as a selective catalytic reduction filter or SCRF. However, the conventional SCRFs have not been a viable alternative for heavy duty diesel applications, such as Class 8 trucks.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a catalytic core for a wall-flow filter includes a plurality of juxtaposed channels extending longitudinally between an inlet side and an outlet side of the catalytic core, wherein inlet channels are plugged at the outlet side and outlet channels are plugged at the inlet side, longitudinal walls forming the inlet and outlet channels, wherein the walls separate the inlet channels from the outlet channels, wherein the walls comprise pores creating passages extending across a width of the walls from the inlet channels to the outlet channels, and one or more catalysts, wherein each catalyst is distributed across the width and length of the walls within internal surfaces of the pores, wherein a loading of each catalyst across the width varies by less than 50% from an average loading across the width.

In some embodiments of the catalytic core, the loading of each catalyst across the width varies by less than a value selected from the group consisting of 40% and 30%.

In some embodiments of the catalytic core, each catalyst is distributed on the internal pore surfaces of the walls within a weight percent range selected from the group consisting of greater than 80% by weight, greater than 70% by weight, greater than 60% by weight, and greater than 50% by weight.

In some embodiments of the catalytic core, each catalyst is distributed on external wall surfaces of the outlet channels within a weight percent range selected from the group consisting of less than 20% by weight, less than 30% by weight, less than 40% by weight, and less than 50% by weight.

In some embodiments of the catalytic core, a porosity of the walls is greater than a porosity selected from the group consisting of 60%, 50%, and 40%.

In some embodiments, the catalytic core comprises a material selected from the group consisting of a ceramic, a metal, silicon carbide, cordierite, and aluminum titanate.

In some embodiments of the catalytic core, the pores have a mean pore size in a size range selected from the group consisting of 5 microns to 50 microns, 10 to 30 microns, and 10 to 20 microns.

In some embodiments of the catalytic core, the core comprises a cell density in a range selected from the group consisting of 100 to 500 cells per inches squared, and 100 to 300 cells per inches squared.

In some embodiments of the catalytic core, a pore volume of pores greater than 100 microns is less than a value selected from the group consisting of 30%, 20%, and 10%.

In some embodiments of the catalytic core, an average thickness of the walls is in a range selected from the group consisting of less than 2 millimeters, less than 1 millimeter, and less than 0.5 millimeter.

In some embodiments of the catalytic core, at least the inlet and outlet channels comprise a monolithic material.

In some embodiments, the catalytic core comprises a first and second catalyst, wherein the first catalyst comprises a metal oxide catalyst and the second catalyst comprises a metal zeolite catalyst.

In some embodiments of the catalytic core, the metal zeolite catalyst comprises iron, copper, or any combination thereof.

In some embodiments of the catalytic core, the metal oxide catalyst comprises a material selected from the group consisting of zirconia, ceria, yttria, yttria-stabilized zirconia, and yttria-stabilized ceria, or a combination thereof.

In some embodiments of the catalytic core, the metal oxide catalyst further comprises copper, iron, nickel, silver, palladium, platinum, niobium, vanadium, titanium, manganese, barium, scandium, calcium, lanthanum, cobalt, chromium, or any combination thereof.

In some embodiments of the catalytic core, the first catalyst is distributed in a first layer, and the second catalyst is distributed in a second layer different than the first layer.

In some embodiments of the catalytic core, the metal oxide catalyst is applied first and the metal zeolite catalyst is applied second.

In some embodiments of the catalytic core, the metal oxide catalyst is applied over a third cerium-based catalyst.

In some embodiments of the catalytic core, the first and second catalysts are distributed within a same layer.

In some embodiments of the catalytic core, the first catalyst comprises a metal oxide catalyst and the second catalyst comprises a metal zeolite catalyst mixed within a single layer.

In some embodiments of the catalytic core, the metal oxide catalyst comprises from 0.1% to 80% by weight of a combined weight of the first and second catalysts.

In some embodiments of the catalytic core, the metal oxide catalyst comprises about 100% by weight of a metal oxide.

In some embodiments of the catalytic core, the metal zeolite catalyst comprises 50% by weight or less of a base metal.

In some embodiments of the catalytic core, the metal oxide catalyst includes a platinum group metal.

In some embodiments of the catalytic core, the metal oxide catalyst does not include a platinum group metal.

In some embodiments of the catalytic core, the first catalyst and the second catalyst are a mixture comprising 19% by weight nano-$Zr_2O$ and 81% by weight CuZSM-5.

In some embodiments of the catalytic core, the loading of the first and second catalyst is each about 20 grams/liter to 150 grams/liter.

In some embodiments of the catalytic core, the one or more catalysts comprise a metal oxide comprising a metal element on a metal oxide surface and less than 10 g/$ft^3$ by weight of Pt or Pd.

In some embodiments of the catalytic core, the one or more catalysts comprise a metal oxide catalyst with cationic dopants.

In some embodiments of the catalytic core, the cationic dopants is selected from the group consisting of $Sr^{2+}$, $Ru^{4+}$, $Rh^{3+}$, $Mg^{2+}$, $Cu^{2+}$, $Cu^{3+}$, $Ni^{2+}$, $Ti^{4+}$, $V^{4+}$, $Nb^{4+}$, $Ta^{5+}$, $Cr^{3+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, and $Nb^{5+}$.

In some embodiments of the catalytic core, the metal oxide is selected from the group consisting of cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, nickel oxide, lanthanum oxide, strontium oxide, and cobalt oxide, or any combination thereof.

In some embodiments of the catalytic core, the metal oxide comprises a metal element selected from the group consisting of Nb, Ca, Sc, Ta, Ti, V, Cr, Mn, Mo, Al, Si, Ge, Ir, Os, Fe, Co, Ni, Cu, Y, Zr, Ru, Rh, Pd, Pt, Ag, Ba, W, La, Ce, and Sr.

In some embodiments, a particulate filter includes at least one inlet channel, at least one outlet channel, a wall separating the inlet channel from the outlet channel, and one or more catalysts, each catalyst is distributed across the width and length of the wall within internal surfaces of the wall, wherein a loading of each catalyst across the width varies by less than 50% from an average loading across the width.

In some embodiments, the particulate filter comprises a first and second catalyst.

In some embodiments of the particulate filter, the first catalyst is configured to make nitrogen dioxide, and the second catalyst is configured to reduce NOx species to nitrogen.

In some embodiments of the particulate filter, the catalyst is configured to oxidize hydrocarbons and carbon dioxide.

In some embodiments, a method of filtering particulates and reducing pollutants from combustion gases within a same device includes directing combustion gases through a porous wall of a particulate removal filter, wherein the porous wall comprises one or more catalysts, wherein each catalyst is distributed across a width and length of the wall within internal surfaces of the pores, wherein a loading of each catalyst across the width varies by less than 50% from an average loading across the width.

In some embodiments, the method comprises a metal oxide catalyst and a metal zeolite catalyst.

In some embodiments, the method comprises converting at least soot and NOx into carbon dioxide and nitrogen, respectively, within the same device.

In some embodiments, the method comprises converting hydrocarbons and carbon monoxide into carbon dioxide and water within the same device.

In some embodiments, the method comprises combusting diesel fuel to generate the combustion gases.

In some embodiments, the method comprises generating the combustion gases from a Class 8 truck.

In some embodiments of the method, the particulate removal filter comprises a plurality of juxtaposed channels extending longitudinally between an inlet side and an outlet side of the filter, wherein inlet channels are plugged at the outlet side and outlet channels are plugged at the inlet side, and further comprising longitudinal walls forming the inlet and outlet channels, wherein the walls separate the inlet channels from the outlet channels, wherein the walls comprise pores creating passages extending across a width of the walls from the inlet channels to the outlet channels.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9A is a graph showing conversion efficiency percentage versus temperature for a Nb surface modified YSZ/YSC catalyst;

DETAILED DESCRIPTION

In a particulate filter with selective catalytic reduction, there are two competing reactions involving nitrogen dioxide. Nitrogen dioxide is the oxidant needed in the soot oxidation process, but nitrogen dioxide is also consumed in the NOx reduction process. These two processes are in competition for the limited amount of nitrogen dioxide available from the diesel oxidation catalyst required for passive oxidation of soot and as a reactant in the fast reduction reaction with ammonia for NOx conversion.

Problems being encountered with the current particulate filters with selective catalytic reduction include high pressure drop across the walls. The use of platinum group metal catalysts can lead to extreme oxidizing of ammonia, thus negatively affecting the selective catalytic reduction process. However, the absence of platinum group metal catalysts reduces the capability for passive soot oxidation and also increases lightoff temperature due to lower concentrations of nitrogen dioxide and the reduction in NOx conversion efficiency.

The current diesel particulate filters with selective catalytic reduction are not suitable for heavy-duty diesel truck applications due to reduced fuel economy, reduced selective catalytic reduction activity, relatively high soot lightoff temperature, and the relatively frequent active regenerations that would be triggered by the high pressure drop across the filter. Accordingly, disclosed are catalytic cores, wall-flow filters, and aftertreatment systems that can effectively perform both soot filtration and soot oxidation and selective catalytic reduction of NOx. Also, disclosed are catalyst compositions that can be used in the diesel particulate filter and the diesel oxidation catalyst unit. The catalytic cores are suitable for the wall-flow filter with selective reduction capacity for NOx. The catalytic cores as wall-flow filters can also be used in the diesel oxidation catalyst unit.

Figure 1:
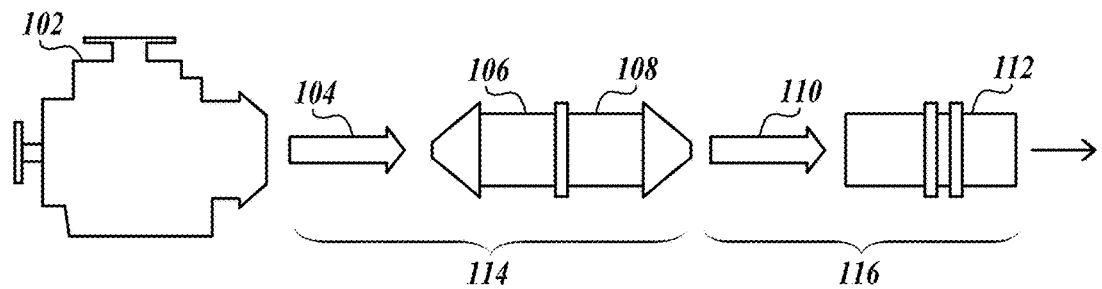
FIG. 1 is a diagrammatical illustration showing a prior art aftertreatment system including a diesel oxidation catalyst, a diesel particulate filter, and a selective catalytic reduction device.

In some embodiments, a binary catalyst composition applied to the catalyst core includes a first catalyst for making nitrogen dioxide in situ (within the filter) without significantly oxidizing ammonia, and a second catalyst for reduction of NOx, thus allowing both reactions for oxidation of soot and reduction of NOx within the same filter. Accordingly, the selective catalytic reduction unit 112 of FIG. 1 is eliminated in an aftertreatment system.

In some embodiments, a binary catalyst composition is used in a diesel particulate filter, such as a wall-flow filter, and particularly applied to the monolithic core of the wall-flow filter. The binary catalyst includes a first catalyst for making $NO_2$ in situ without significantly oxidizing $NH_3$ and a second catalyst for selective catalytic reduction of NOx. In addition, the distribution of the binary catalyst is provided in the internal surface areas of the wall in a manner such that the distribution or loading of the binary catalyst is generally symmetrical across the wall.

Figure 2:
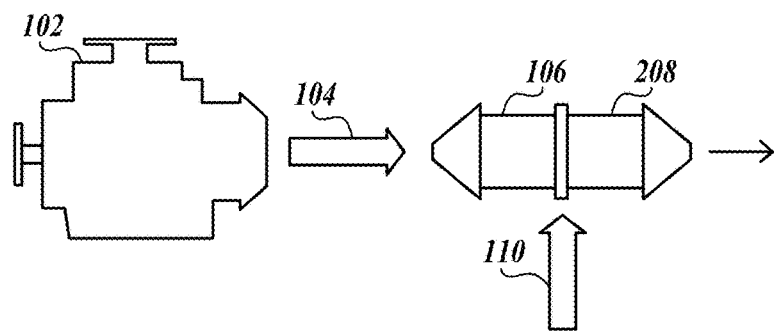
FIG. 2 is a diagrammatical illustration of an aftertreatment system including a diesel oxidation catalyst and a particulate filter with selective catalytic reduction capability suitable for heavy duty diesel operations.

Referring to FIG. 2, an aftertreatment system is illustrated having a diesel particulate filter 208 with a catalytic core having the binary catalyst composition including a first catalyst for making nitrogen dioxide and a second catalyst for selective catalytic reduction of NOx loaded thereon. In some embodiments, the aftertreatment system may further include a diesel oxidation catalyst unit 106 for the elimination of hydrocarbons, carbon monoxide, and for producing nitrogen dioxide. However, owing to the catalysts used in the diesel particulate filter 208, the dependence on platinum group metal catalysts in the diesel oxidation catalyst unit 106 to generate nitrogen dioxide is reduced. Also, the size of the diesel oxidation catalyst unit 106 can be reduced when combined with the diesel particulate filter 208 having selective catalytic reduction. In some embodiments, the diesel oxidation catalyst unit 106 may be omitted.

The aftertreatment system of FIG. 2 may further optionally include a hydrocarbon doser 104 for the introduction of diesel fuel, for example, for increasing temperature for the active regeneration of the diesel particulate filter 208. In some embodiments, the hydrocarbon doser 104 may be omitted. The aftertreatment system of FIG. 2 may further include a diesel exhaust fluid doser 110 for the introduction of urea, which then decomposes into ammonia. Comparing FIG. 2 to FIG. 1, the exhaust fluid doser 110 is moved from before the selective catalytic reduction unit 112 to before the diesel particulate filter 208. The diesel particulate filter 208 has an outer metal shell with a catalytic core supported therein. In some embodiments, the diesel particulate filter will use a wall-flow filter as the core.

Wall-Flow Filter/Catalytic Core 300 for Diesel Particulate Filters 208 and Diesel Oxidation Catalyst Units 106

Figure 3:
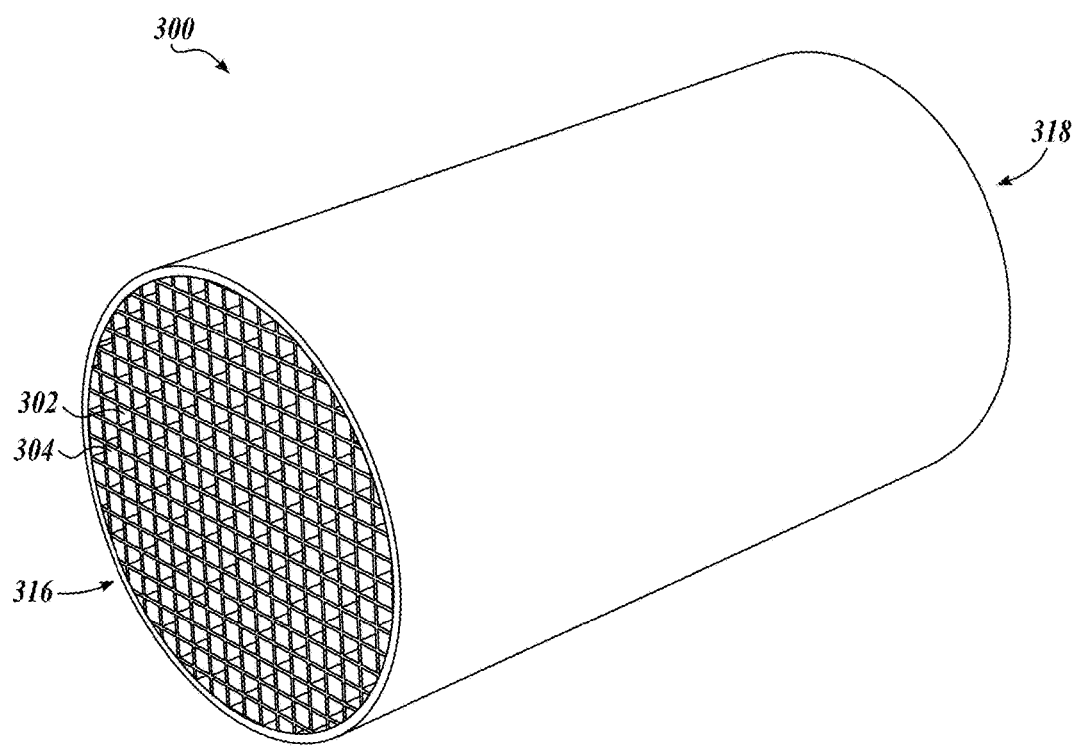
FIG. 3 is a diagrammatical illustration of a catalytic core for a wall-flow particulate filter.
Figure 4:
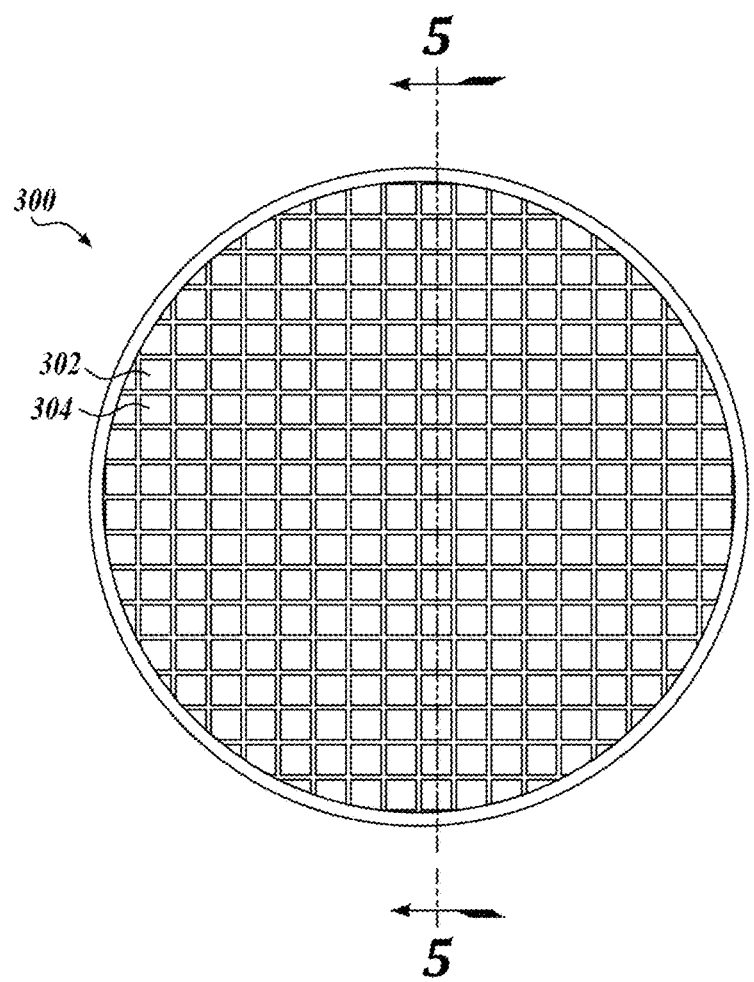
FIG. 4 is a diagrammatical illustration of an end view of the catalytic core of FIG. 3.

Referring to FIG. 3, one embodiment of a catalytic core 300 is shown. The catalytic core 300 can be included, for example, in one or both of the diesel particulate filter 208 and the diesel oxidation catalyst 106 illustrated in FIG. 2. The catalysts that are loaded on the catalytic core 300 will determine whether it is used in the diesel particulate filter 208 or the diesel oxidation catalyst unit 106. In some embodiments, the catalytic core 300 is a wall-flow filter. In some embodiments, an aftertreatment system may include a diesel oxidation unit 106 with a wall-flow filter/catalytic core 300 followed downstream by a diesel particulate filter with selective catalytic reduction capacity having a wall-flow filter/catalytic core 300. By having two wall-flow filters at the diesel oxidation unit 106 and the diesel particulate filter 208, the capacity for soot retention can be increased.

In some embodiments, the catalytic core 300 may be formed from a monolithic material. Alternatively, in some embodiments the catalytic core 300 is not monolithic and may be formed from more than one material.

Figure 5:
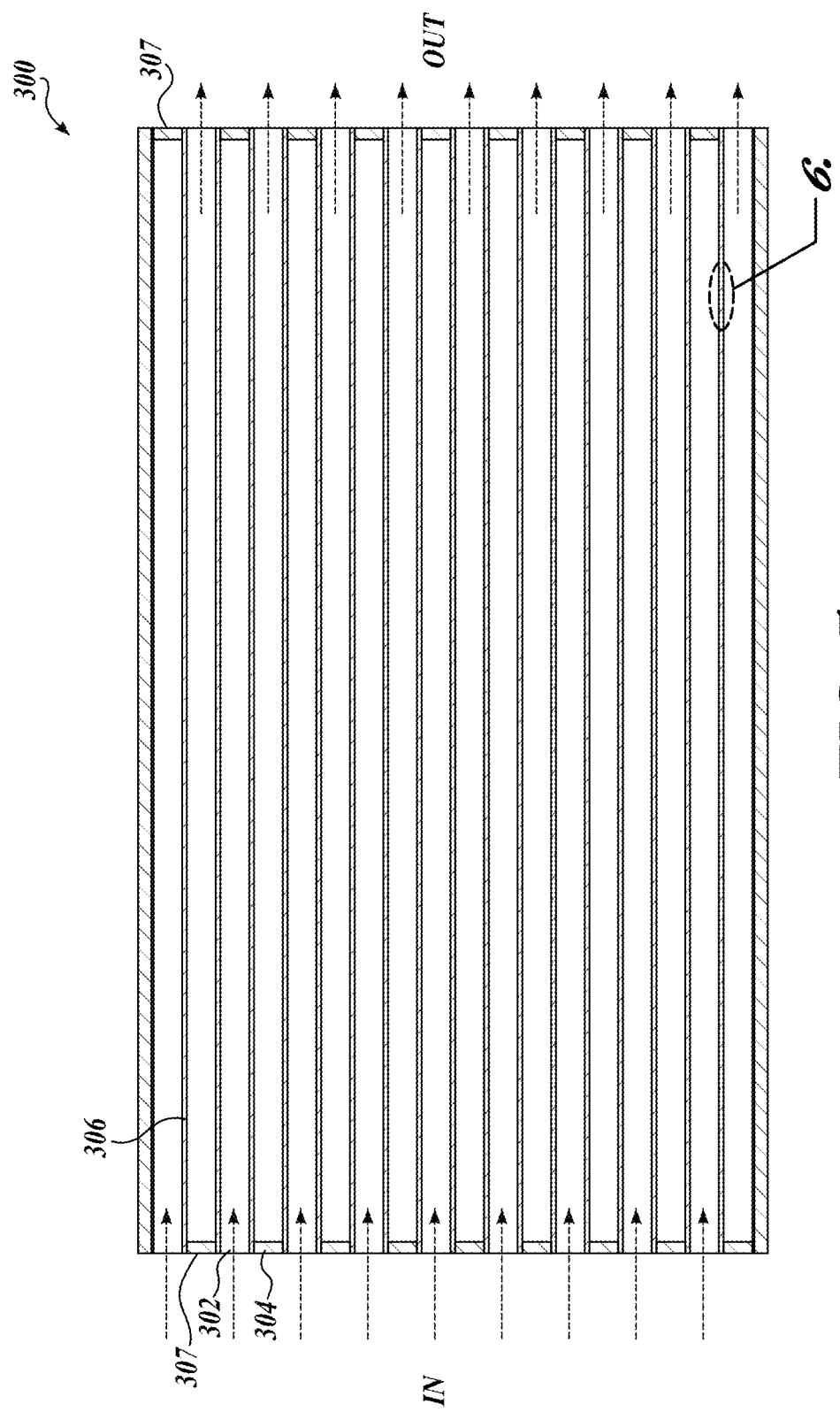
FIG. 5 is a diagrammatical illustration of a side cross-sectional view of the catalytic core of FIG. 4.

FIG. 3 illustrates that the catalytic core 300 includes a plurality of inlet channels 302 longitudinally juxtaposed (side by side) with the outlet channels 304 (best seen in FIG. 5). The catalytic core 300 has an inlet side 316, and the inlet channels 302 are open-ended on the inlet side 316. The catalytic core 300 has an outlet side 318, and the inlet channels 302 are closed on the outlet side 318 (as best seen in FIG. 5). The outlet channels 304 are closed on the inlet side 316 and open on the outlet side 318. Both the inlet channels 302 and the outlet channels 304 can be closed by plugging with plugs 307 the respective individual inlet 302 and outlet 304 channels on the appropriate side of the channels.

In some embodiments, the inlet 302 and outlet 304 channels of the catalytic core 300 are formed out of a monolithic material. In some embodiments, the inlet 302 and outlet 304 channels and the plugs 307 of the catalytic core 300 are formed out of a monolithic material. In some embodiments, the catalytic core 300 does not include plugs 307, in which case the catalytic core is a flow-through catalytic core. In cases where the catalytic core 300 does not include plugs 307, the catalytic core 300 may serve as a diesel oxidation catalyst unit or a selective catalytic reduction unit, neither of which requires filtering capability.

A cross section of the wall-flow filter/catalyst core 300 is illustrated in FIG. 5. The exhaust gases entering from the inlet side 316 will exit from the outlet side 318 by passing through the porous walls 306 separating the inlet channels 302 from the outlet channels 304.

Figure 6:
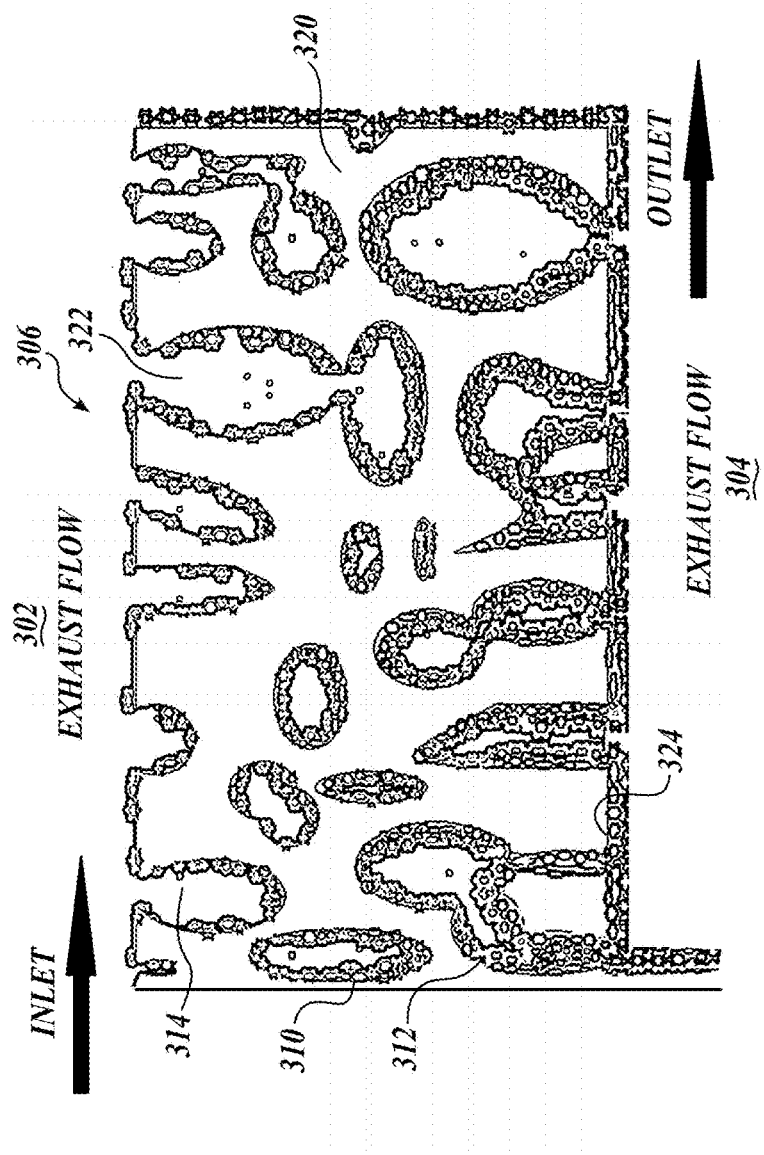
FIG. 6 is a diagrammatical illustration of a magnified portion of a porous wall of the catalytic core of FIG. 5.

FIG. 6 shows an enlarged section of a porous wall 306 separating an inlet channel 302 from the outlet channel 304. The porous wall 306 is made from a substrate material 320 having pores 322 therein. The pores 322 extend both longitudinally along the wall 306 and also extend across the width of the wall 306. The wall 306 can have open-celled pores and closed-cell pores. However, the wall 306 has a sufficient number of interconnected open-celled pores 322 along the width of the wall 306 to form passages extending from an inlet channel 302 to an outlet channel 304. Thus, exhaust gases will traverse the walls 306 in the width direction from the inlet channels 302 to the outlet channels 304 in order to exit from the outlet 318.

The porous substrate 306 is manufactured according to conventional methods. While the porous substrate 306 may be illustrated by referring to a ceramic monolith, the porous substrate can be made from other materials, such as metals, or a combination of metals and ceramics.

Referring to FIG. 6, in some embodiments, the porous substrate 320 is treated to have one or more catalysts 310 and 312 loaded on the internal surface areas of the open-celled pores 322 to provide a catalytic core 300 that can function as a particulate filter 208 with selective catalytic reduction of NOx. In some embodiments, the porous substrate 320 is treated to have one or more catalysts 310 and 312 loaded on the internal surface areas of the open-celled pores 322 to provide a catalytic core 300 that can function as a particulate filter 208 with catalytic oxidation of hydrocarbons, carbon monoxide, or nitrogen monoxide.

In some embodiments, the distribution of the first 310 and second 312 catalysts is controlled to be present in certain locations within the core 300. In FIG. 6, a first catalyst 310 and a second catalyst 312 are loaded on the internal wall surfaces of the pores 322 and on the exterior walls 324 of the outlet channels 304. In some embodiments, the majority by weight of the first catalyst 310 is loaded on the internal surfaces of the pores 322, and a minority by weight of the first catalyst 310 is loaded on the external wall surfaces 324 of the outlet channels 304. In some embodiments, the majority by weight of the second catalyst 312 is loaded on the internal surfaces of the pores 322, and a minority by weight of the second catalyst 312 is loaded on the external wall surfaces 324 of the outlet channels 304.

In some embodiments, the catalytic core 300 for the wall-flow filter 208 includes a plurality of juxtaposed channels extending longitudinally between an inlet side 316 and an outlet side 318 of the core 300, wherein inlet channels 302 are plugged at the outlet side 318 and outlet channels 304 are plugged at the inlet side 316. In some embodiments, the catalytic core 300 includes longitudinal walls 306 forming the inlet and outlet channels, wherein the walls 306 separate the inlet channels 302 from the outlet channels 304, wherein the walls 306 comprise pores 322 creating passages extending across a width of the walls 306 from the inlet channels 302 to the outlet channels 304. In some embodiments, the catalytic core 300 includes a first and second catalyst 310, 312, each catalyst 310, 312 being distributed across the width and length of the walls 306 within internal surfaces of the pores 322, wherein a loading of each catalyst 310, 312 across the width varies by less than 50% from an average loading across the width.

In some embodiments, loading refers to a concentration by volume or area, such as grams/liter or grams/inches squared. In some embodiments, the loading of each catalyst 310, 312 across the width varies by less than 40% from an average value. In some embodiments, the loading of each catalyst 310, 312 across the width varies by less than 30% from an average value. In some embodiments, a "generally symmetrical" catalyst loading refers to the catalyst being distributed across the width such that the concentration across the width varies by less than 50% from the average concentration across the width. In some embodiments, a "generally symmetrical" catalyst loading refers to the catalyst being distributed across the width such that the concentration across the width varies by less than 50% from the average concentration across the width. In some embodiments, a "generally symmetrical" catalyst loading refers to the catalyst being distributed across the width such that the concentration across the width varies by less than 40% from the average concentration across the width. In some embodiments, a "generally symmetrical" catalyst loading refers to the catalyst being distributed across the width such that the concentration across the width varies by less than 30% from the average concentration across the width. In some embodiments, a "generally symmetrical" catalyst loading refers to the catalyst being distributed across the width such that the concentration across the width varies by less than 20% from the average concentration across the width. In some embodiments, a "generally symmetrical" catalyst loading refers to the catalyst being distributed across the width such that the concentration across the width varies by less than 10% from the average concentration across the width. In some embodiments, a "generally symmetrical" catalyst loading refers to the catalyst being distributed across the width such that the concentration across the width varies by less than 5% from the average concentration across the width.

In some embodiments, greater than 80% by weight of each catalyst 310, 312 from the total amount of each catalyst in the catalytic core 300 is distributed on the internal pore surfaces of the walls 306. In some embodiments, greater than 70% by weight of each catalyst 310, 312 from the total amount of each catalyst in the catalytic core 300 is distributed on the internal pore surfaces of the walls 306. In some embodiments, greater than 60% by weight of each catalyst 310, 312 from the total amount of each catalyst in the catalytic core 300 is distributed on the internal pore surfaces of the walls 306. In some embodiments, greater than 50% by weight of each catalyst 310, 312 from the total amount of each catalyst in the catalytic core 300 is distributed on the internal pore surfaces of the walls 306. In some embodiments, less than 20% by weight of each catalyst 310, 312 from the total amount of each catalyst in the catalytic core 300 is distributed on external wall surfaces 324 of the outlet channels 304. In some embodiments, less than 30% by weight of each catalyst 310, 312 from the total amount of each catalyst in the catalytic core 300 is distributed on external wall surfaces 324 of the outlet channels 304. In some embodiments, less than 40% by weight of each catalyst 310, 312 from the total amount of each catalyst in the catalytic core 300 is distributed on external wall surfaces 314 of the outlet channels 304. In some embodiments, less than 50% by weight of each catalyst 310, 312 from the total amount of each catalyst in the catalytic core 300 is distributed on external wall surfaces 324 of the outlet channels 304. In some embodiments, the distribution allows establishing and maintaining a low pressure drop under operating conditions. In some embodiments, low pressure drop operation is made possible by the combined effects, including high catalyst activity for NOx reduction efficiency in low nitrogen dioxide exhaust streams, requiring a lower total mass of catalyst, generally symmetrical catalyst distribution on the internal surfaces of the walls 306, and high surface-to-volume ratio of the catalyst.

In some embodiments, a porosity (also referred to as void fraction) of the walls 306 is equal to or greater than 60%. In some embodiments, a porosity of the walls 306 is equal to or greater than to 50%. In some embodiments, a porosity of the walls 306 is equal to or greater than 40%. In some embodiments, porosity includes the contribution of the volume of closed cells, if any are present. In some embodiments, porosity does not include the contribution of the volume of closed cells, if present. In some embodiments, the catalytic core 300 has a high porosity attributed to the open cells of sufficient size and quantity to achieve a high internal wall filter surface area. To this end, a 65% porosity silicon carbide wall-flow filter core, manufactured by Dinex Emission Inc., is one example of a suitable substrate 320 for embodiments of the catalytic core 300. However, other embodiments of the substrate 320 having similar high porosity can be constructed from any mechanically and thermally durable material, including but not limited to, ceramic materials, cordierite, silicon carbide, and metals.

In some embodiments, the catalytic core 300 is made from a ceramic, a metal, silicon carbide, cordierite, or aluminum titanate. In some embodiments, the pores 322, including open-celled pores, have a mean pore size of 5 microns to 50 microns. In some embodiments, the pores 322, including open-celled pores, have a mean pore size of 10 to 30 microns. In some embodiments, the pores 322, including open-celled pores, have a mean pore size of 10 to 20 microns.

In some embodiments, the catalytic core 300 has a cell density from 100 to 500 cells per inches squared. In some embodiments, the catalytic core 300 has a cell density from 100 to 300 cells per inches squared. In some embodiments, the catalytic core 300 has a pore volume of pores greater than 100 microns of less than 30%. In some embodiments, the catalytic core 300 has a pore volume of pores greater than 100 microns of less than 20%. In some embodiments, the catalytic core 300 has a pore volume of pores greater than 100 microns of less than 10%.

In some embodiments, the wall 306 average thickness is less than 2 millimeters. In some embodiments, the wall 306 average thickness is less than 1 millimeter. In some embodiments, the wall 306 average thickness is less than 0.5 millimeter.

In some embodiments, at least the inlet 302 and outlet 304 channels comprise a monolithic material.

As mentioned above, a feature of the catalytic core 300 is the loading of the catalyst or catalysts in a manner that results in small variations in the concentration in the width direction of the walls. In some embodiments, a method of achieving the desired concentration includes charging the inlet 302 and outlet 304 channels with deionized water several times the total void and outlet channel volumes of the substrate core 326. After charging with water, a vacuum is applied to remove the bulk water from the channels 302, 304 and from inside the pores 322. This leaves wetted surfaces on the internal surface areas of the pores 322 and the external channel walls 306.

As low viscosity washcoat of the first 310 or second 312 catalyst or both catalysts 310, 312 is prepared to render a slurry capable of passing into and through the pores 322. The low viscosity washcoat is introduced into the outlet channels 304 of the substrate 320 and allowed to flow through the pores 322 on the wetted surfaces (with minimal frictional resistance), under gravity flow or low vacuum. Then, when bulk liquid is observed emerging from the inlet channels 302, a higher vacuum is applied to remove (the almost optically clear) bulk water. The introduction of the low viscosity washcoat slurry followed by applying a high vacuum is repeated until the bulk liquid that is removed under high vacuum appears markedly cloudy with slurry components, signifying that the internal pore 322 surfaces have been coated with a thin layer of washcoat in a "generally symmetrical" distribution.

It is believed that the conventional method for applying a catalyst washcoat does not achieve pre-wetted substrates, which means that frictional forces between the slurry and the dry pore wall surfaces prevents free flow out the entire pore structure before adsorption of the solids to the surface occurs. This results in asymmetrical distribution of the washcoat in the substrate wall.

Figure 7B:
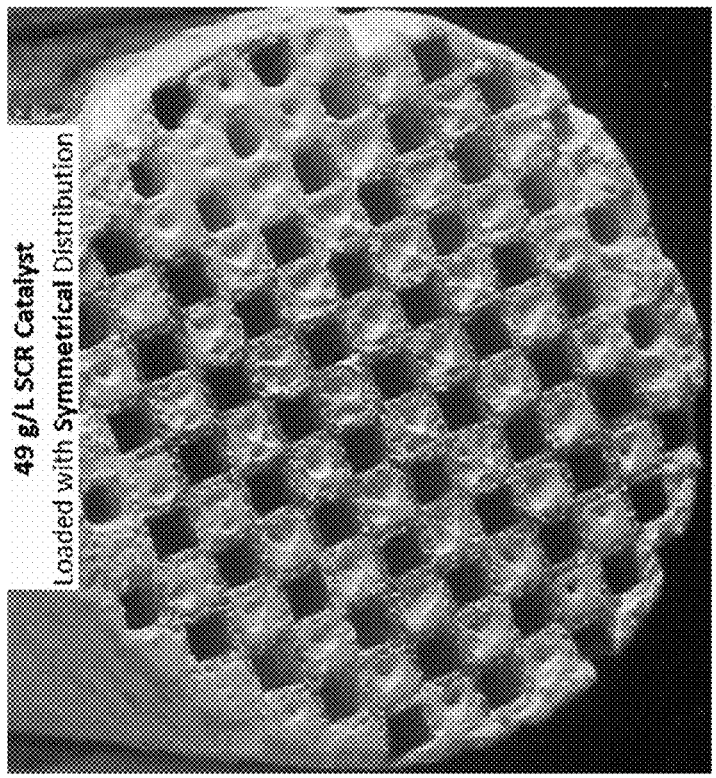
FIG. 7B is a photograph of a catalytic core with a "generally symmetrical" distribution of catalyst.
Figure 7A:
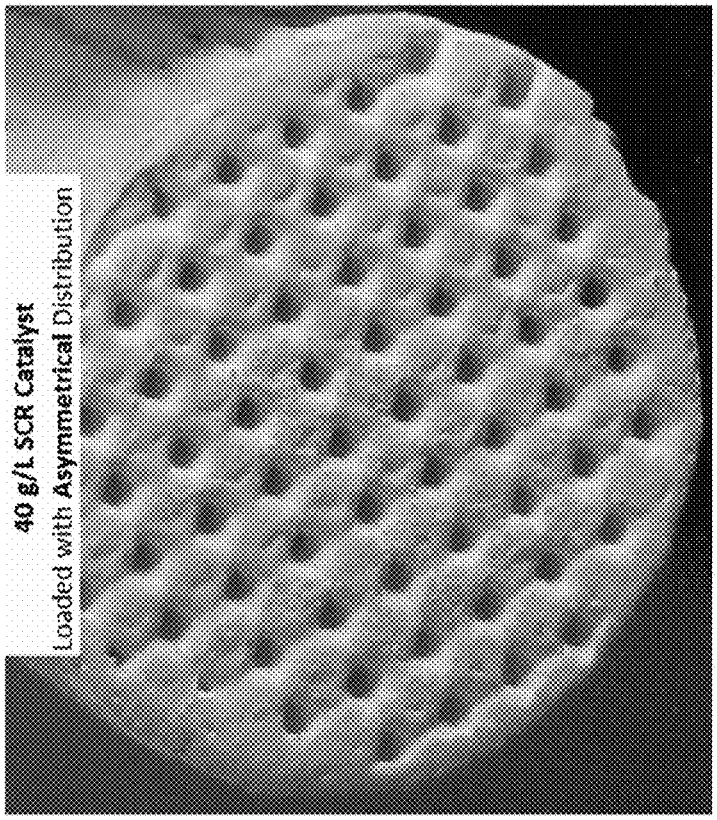
FIG. 7A is a photograph of a catalytic core with an asymmetrical distribution of catalyst.

FIG. 7B shows a generally symmetrical distribution of catalyst within a core that is distinctly different from the conventional asymmetric distribution of catalyst within a core shown in FIG. 7A. Benefits can be attained from the generally symmetric distribution, including higher surface-to-volume ratio per unit mass of catalyst is achieved, lower catalyst loading may be employed to achieve equivalent or better NOx reduction efficiency than in an asymmetric distribution of catalyst (even when higher catalyst loading levels are used in the case of asymmetric distribution), and significantly lower pressure drop across the filter may be achieved, with equal or better soot lightoff properties (i.e., lower lightoff temperatures, to facilitate passive regeneration).

In some embodiments, a method of making a catalytic core 300 with a "generally symmetrical" distribution of a catalyst 310, 312 across the width of a wall 306 separating an inlet channel 302 from an outlet channel 304 includes pre-wetting the internal surfaces of pores 322 with any aqueous or non-aqueous wetting agent. In some embodiments, the wetting agent or the pre-wetting process, before catalyst washcoat application, is used to control the distribution of the catalyst loading along the width of the wall 306 to achieve a "generally symmetrical" catalyst loading distribution across the width of the wall, or alternatively, any distribution desired. The wetting agent may include non-polar or hydrophobic surfactants, such as Surfynol®. The wetting agent can be employed to replace pre-wetting using deionized water.

Catalysts for the Diesel Particulate Filter 208

Disclosed are representative catalyst compositions for the wall-flow filter/catalytic core 300 when used as a diesel particulate filter 208.

In some embodiments, the first catalyst 310 is capable of catalyzing reactions to make nitrogen dioxide. In some embodiments, the first catalyst 310 does not significantly oxidize ammonia. As ammonia is used in the reduction of NOx, the first catalyst 310 should preferably minimize oxidation of ammonia. Oxidation of ammonia produces $N_2O$; therefore, ammonia oxidation can be quantified by measuring the relative increase in $N_2O$ production. In some embodiments, a relative increase in $N_2O$ production of 20% would be significant oxidation of ammonia. However, any ammonia oxidation to produce $N_2O$ is highly undesirable; therefore, decreasing $N_2O$ production as much as possible is preferred. In some embodiments, the first catalyst 310 is sometimes referred to as a selective catalytic oxidation catalyst or an "$NO_2$-make" catalyst for ease of understanding the disclosure.

In some embodiments, the second catalyst 312 is a catalyst for selective catalytic reduction of NOx into nitrogen and water. In some embodiments, the second catalyst 312 is sometimes referred to as a selective catalytic reduction catalyst for ease of understanding the disclosure. In some embodiments, NOx refers to any oxide of nitrogen, including, but not limited to, nitric oxide (NO) and nitrous oxide ($N_2O$).

In some embodiments, the loading of the first 310 and second 312 catalyst is each about 20 grams/liter to 150 grams/liter internally within the internal pores 322 of the walls 306 of the core 300.

In some embodiments, the first catalyst 310 comprises a metal oxide catalyst and the second catalyst 312 comprises a metal zeolite catalyst. In some embodiments, the metal zeolite catalyst 312 comprises iron, copper, or any combination thereof. In some embodiments, the metal oxide catalyst 310 comprises zirconia, ceria, yttria, or any combination thereof. In some embodiments, the metal oxide catalyst 310 comprises yttria-stabilized zirconia (YSZ), yttria-stabilized ceria (YSC), or a combination thereof. In some embodiments, the metal oxide catalyst 312 further comprises copper, iron, nickel, silver, palladium, platinum, niobium, vanadium, titanium, manganese, barium, scandium, calcium, lanthanum, titanium, cobalt, chromium, or any combination thereof.

In some embodiments, the metal oxide catalyst 312 and metal zeolite catalyst 310 includes 81% by weight CuZSM-5 and 19% by weight nano-particle sized $ZrO_2$ (in the form of Nyacol), in which the metal oxide is homogeneously mixed with the metal zeolite in a single coating.

Additional metal oxide catalysts 312 and metal zeolite catalysts 310 are made by methods disclosed in the application entitled "Surface-Modified Catalyst Precursors for Diesel Engine Aftertreatment Applications," to Randal A. Goffe, U.S. patent application Ser. No. 14/934,955, which is incorporated herein expressly by reference. The methods may include providing a solution comprising an organic solvent and an organometallic compound selected from a metal alkoxide, a metal carboxylate, a metal acetylacetonate, a metal organic acid ester, and a combination thereof, mixing the solution with a metal oxide, a metal zeolite, or both a metal oxide and a metal zeolite to provide a mixture, drying the mixture, and calcining the mixture to provide a surface-modified metal oxide catalyst. In some embodiments, the organometallic compound comprises an element selected from Nb, Ca, Sc, Ta, Ti, V, Cr, Mn, Mo, Al, Si, Ge, Ir, Os, Fe, Co, Ni, Cu, Y, Zr, Ru, Rh, Pd, Pt, Ag, Ba, W, La, Ce, Sr, and any combination thereof. In some embodiments, the metal alkoxide is selected from titanium (IV) ethoxide, titanium (IV) isopropoxide, titanium (IV) butoxide, barium (II) t-butoxide, yttrium (III) 2-methoxyethoxide, niobium (III) chloride 1,2-dimethoxyethane, niobium ethoxide, $Re_4O_{6-y}(OCH_3)_{12+y}$, $Re_{4-x}Mo_xO_{6-y}(OCH_3)_{12+y}$, $Re_{4-x}W_xO_{6-y}(OCH_3)_{12+y}$, titanium isopropoxide, titanium ethoxide, zirconium ethoxide, tetraethyl orthosilicate, aluminium isopropoxide, niobium ethoxide, tantalum ethoxide, potassium tert-butoxide, $[CrAl(OPr^i)_4]_3$, $Mn[Al(OPr^i)_4]_2$, $[Fe\{Al(OPr^i)_4\}_{2or3}]$, $Co[Al(OPr^i)_4]_2$, $Ni[Al(OPr^i)_4]_2$, $Ni[Ga(OPr^i)_4]_2$, $Ni[Nb(OPr^i)_6]_2$, $[Ni[Ta[OPr^i]_6]_2$, $Ni[Zr_2(OPr^i)_9]_2$, and $Cu[Al(OPr^i)_4]_2$.

In some embodiments, the metal alkoxide is niobium ethoxide. In some embodiments, the metal carboxylate is selected from zirconium propionate, zirconium acetato-propionate; $Zr(acac)_4$; dicalcium barium propionate, $Ca_2Ba(C_2H_5COO)_6$; $Zr(CH_3CH_2COO)_4$; lanthanum propionate. In some embodiments, the metal carboxylate is a metal ethyl diamine or metal phthalimide, where the metal is selected from Zr, Ba, Ti, La, Sr, Ce, and Nb. In some embodiments, the metal acetylacetonate is selected from titanium diisopropoxide bis(acetylacetonate) $(CH_3)_2CHO]_2Ti(C_5H_7O_2)_2)$; zirconium (IV) acetylacetonate; $Zr(C_5H_7O_2)_4$; palladium(II) acetylacetonate, $C_{10}H_{14}O_4Pd$; platinum(II) acetylacetonate, $Pt(C_5H_7O)_2$; titanium bis(acetylacetonate)dichloride; vanadyl acetylacetonate; chromium acetylacetonate; manganese(III) acetylacetonate; iron acetylacetonates; ruthenium acetylacetonates; cobalt acetylacetonates; iridium acetylacetonates; nickel(II) acetylacetonate; copper acetylacetonate; and zinc acetylacetonate. In some embodiments, the solution further comprises a low molecular weight polymer selected from poly(propylene glycol), poly(ethylene glycol), and copolymers thereof. In some embodiments, the metal oxide is selected from cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, nickel oxide, and any combination thereof. In some embodiments, the metal oxide further comprises a cationic dopant. In some embodiments, the cationic dopant selected from $Sr^{2+}$, $Ru^{4+}$, $Rh^{3+}$, $Mg^{2+}$, $Cu^{2+}$, $Cu^{3+}$, $Ni^{2+}$, $Ti^{4+}$, $V^{4+}$, $Nb^{4+}$, $Ta^{5+}$, $Cr^{3+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, and $Nb^{5+}$. In some embodiments, the cationic dopant is selected from $Y^{3+}$, $Sc^{3+}$, and $Ca^{2+}$. In some embodiments, the metal oxide is selected from yttria-stabilized zirconia, yttria-stabilized ceria, and a combination thereof. In some embodiments, the metal zeolite is selected from Fe-doped aluminosilicate zeolites, Cu-doped aluminosilicate zeolites, Fe and Cu-doped aluminosilicate zeolites, Fe-doped silico-alumino-phosphate zeolites, Cu-doped silico-alumino-phosphate zeolites, and Fe and Cu-doped silico-alumino-phosphate zeolites. In some embodiments, the method includes exposing the surface-modified metal oxide catalyst to a solution comprising nickel ions, copper ions, or a combination thereof. In some embodiments, the method further includes calcining the surface-modified metal oxide catalyst after exposing the surface-modified metal oxide catalyst to a solution comprising nickel ions, copper ions, or a combination thereof.

In some embodiments, the first catalyst 310 is distributed in a first layer in the pores 322 of the walls 306 of the core 300, and the second catalyst 312 is distributed in a second layer in the pores 322 of the walls 306 of the core 300, wherein the second layer is different than the first layer. In some embodiments, the first 310 and second 312 catalysts are distributed within the same layer, meaning the first and second catalysts are mixed, in the pores 322 of the walls 306 of the core 300. In some embodiments, the metal oxide catalyst 310 is applied first and the metal zeolite catalyst 312 is applied second. In some embodiments, the metal zeolite catalyst 312 is applied first and the metal oxide catalyst 310 is applied second. In some embodiments, whichever of the metal oxide catalyst 310 or the metal zeolite catalyst 312 is applied first or if the mixture of the two is applied, such catalyst is applied over a third cerium-based catalyst. In some embodiments, the cerium-based catalyst is first coated onto the catalytic core 300 for oxidation of soot in a diesel particulate filter core.

In some embodiments, the metal oxide catalyst 310 comprises from 0.1% to 80% by weight based on a combined weight of the first 310 (metal oxide) and second 312 (metal zeolite) catalysts. In some embodiments, the metal oxide catalyst 310 comprises about 100% by weight of a metal oxide. In some embodiments, the metal zeolite catalyst 312 comprises 50% by weight or less of a base metal.

In some embodiments, the combined performance of the first 310 and second 312 catalysts may be optimized by the addition of base metals, such as Cu Fe, and Ni, to the first 310 metal oxide catalyst to achieve improved NOx reduction efficiency and lower soot lightoff temperature for achieving passive soot oxidation.

In some embodiments, the metal zeolite catalyst 312 comprises iron, copper, or any combination thereof. In some embodiments, the metal zeolite catalyst 312 comprises a zeolite including, but not limited to, ZSM-5, SSZ-13, or SAPO-4. In some embodiments, the metal oxide catalyst 310 includes a platinum group metal. In some embodiments, the metal oxide catalyst 310 does not include a platinum group metal. In some embodiments, a platinum group metal can include ruthenium, rhodium, palladium, osmium, iridium, and platinum.

Additional metal oxide catalysts 312 and metal zeolite catalysts 310 are disclosed in the application entitled, "High Efficiency and Durability Selective Catalytic Reduction Catalyst," to Randal A. Goffe, U.S. patent application Ser. No. 14/935,048, which is incorporated herein expressly by reference. Such binary catalysts may include, but are not limited to, metal oxide catalyst combined with metal zeolite catalyst or a metal oxide catalyst combined with a vanadium oxide catalyst. In some embodiments, the metal oxide is selected from cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, nickel oxide, barium oxide, yttrium oxide, scandium oxide, calcium oxide, manganese oxide, chromium oxide, lanthanum oxide, strontium oxide, cobalt oxide, and any combination thereof. In some embodiments, the metal oxide is selected from the group consisting of titanium oxide, zirconium oxide, cerium oxide, and any combination thereof. In some embodiments, the metal oxide further comprises a cationic dopant. In some embodiments, the cationic dopant is an oxide comprising $Mg^{2+}$, $Cu^{2+}$ $Cu^+$, $Ni^{2+}$, $Ti^{4+}$, $V^{4+}$, $Nb^{4+}$, $Ta^{5+}$, $Cr^{3+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Sn^{4+}$, $Co^{2+}$, $Ni^{2+}$, $Ba^{2+}$, $La^{3+}$, $Ce^{4+}$, and $Nb^{5+}$, $Sr^{2+}$. In some embodiments, the cationic dopant is present in an amount of between about 0.001 mol % to 40 mol %. In some embodiments, the cationic dopant is selected from $Y^{3+}$, $Sc^{3+}$, and $Ca^{2+}$. In some embodiments, the cationic dopant is present in an amount of between about 0.001 mol % to 40 mol %. In some embodiments, the metal oxide is selected from yttria-stabilized zirconia, yttria-stabilized ceria, and a combination thereof. In some embodiments, the metal oxide further comprises a metal element on a surface of the metal oxide. In some embodiments, the metal element is selected from Nb, Ca, Sc, Ti, V, Cr, Mn, Fe, Co, Ni, Cu, Y, Zr, Ru. Rh, Pd, Pt, Ag, Ba, W, La, Ce, and any combination thereof.

In some embodiments, the metal zeolite catalyst is selected from Fe-doped aluminosilicate zeolites, Cu-doped aluminosilicate zeolites, Fe and Cu-doped aluminosilicate zeolites, Fe-doped silico-alumino-phosphate zeolites, Cu-doped silico-alumino-phosphate zeolites, and Fe and Cu-doped silico-alumino-phosphate zeolites. In some embodiments, the Cu content of the metal zeolite catalyst is present in an amount of between about 0.01 to 5 wt %. In some embodiments, the Fe content of the metal zeolite catalyst is present in an amount of loading of zeolite in the range of about 0.01 to 5 wt %.

In some embodiments, the vanadium oxide catalyst is selected from VO, $V_2O_3$, $VO_2$, $V_2O_5$, $V_3O_7$, $V_4O_9$, and $V_6O_{13}$, $V_4O_7$, $V_5O_9$, $V_6O_{11}$, $V_7O_{13}$ and $V_8O_{15}$.

In some embodiments, the binary catalyst comprises from 2 wt % to 50 wt % by weight of the metal oxide catalyst.

In some embodiments, the binary catalyst comprises from 50 wt % to 98 wt % by weight of a metal zeolite catalyst.

In some embodiments, the binary catalyst comprises from 50 wt % to 98 wt % by weight of a vanadium oxide catalyst.

In some embodiments, the metal oxide catalyst 310 provides an oxidative environment at close proximity to the NOx reduction active sites of the metal-zeolite catalyst 312 to effectively accelerate the standard selective catalytic reduction reaction kinetics by generating stable $NO_2$ reaction intermediates in situ from oxidation of NO, as shown below as the fast SCR reaction, and without significant enhancement of $N_2O$ from $NH_3$ oxidation (i.e., selective catalytic oxidation).

In some embodiments, the first catalyst 310 is a catalyst that facilitates formation of $NO_2$ species in situ to serve as reactive intermediates derived from nitrogen oxides in the exhaust stream by selective oxidation, without significantly oxidizing $NH_3$ into $N_2O$ according to the reaction:

$$NO + \frac{1}{2}O_2 \rightarrow NO_2$$

The "standard" SCR (selective catalytic reduction) reaction is effectively converted into the "fast" SCR reaction, in the absence of $NO_2$ from the diesel oxidation catalyst:

$4NO+4NH_3+O_2 \rightarrow 4N_2+6H_2O$  Standard SCR reaction $NO+NO_2+2NH_3 \rightarrow 2N_2+3H_2O$  Fast SCR Reaction In some embodiments, the first 310 metal oxide catalyst is selected from the group of cationically-doped redox catalysts (e.g. yttria doped zirconia and yttria doped ceria), used either separately or in combination. In some embodiments, the first 310 metal oxide catalyst can be optimized to maximize nitrogen dioxide creation, with minimal ammonia oxidation by a process of surface modification.

In some embodiments, the first 310 metal oxide catalyst may optionally be incorporated into the second 312 metal zeolite catalyst layer. In some embodiments, the first 310 metal oxide catalyst is composed of the very lowest oxidizing power metal oxide to avoid oxidative damage to the metal zeolite during fabrication. In some embodiments, the first 310 metal oxide catalyst in this regard should have a relatively high $Zr^{4+}$ content.

In some embodiments, the NOx reduction efficiency is excellent for a diesel particulate filter having a catalytic core 300 with a generally symmetrical loaded catalyst when clean and soot-loaded, and is comparable to the conventional diesel particulate filters with selective catalytic reduction with superior low temperature (230° C.) and high temperature (≥450° C.) activity.

In some embodiments, oxidation of soot can occur passively. In passive soot oxidation, the normal operating temperature of the exhaust gas is sufficient to initiate lightoff and soot oxidation. In some embodiments, active oxidation of soot can be performed when the exhaust gas temperature is insufficient. Active oxidation can, for example, include the dosing of diesel fuel into the exhaust gas to increase temperature.

In conventional heavy duty diesel systems with a particulate filter combined with selective catalytic reduction, there is a relatively high frequency of active regeneration, which is thought to be related to the increased pressure drop from the catalyst washcoat deposited on core. This problem is addressed by the reduced soot-loaded pressure drop capability.

In conventional particulate filters combined with selective catalytic reduction, there is the concern that hydrocarbon or carbon monoxide might slip past the catalyst. This concern is addressed by the "selective oxidative" properties by the first 310 metal oxide catalyst in the binary catalyst composition, while leaving $NH_3$ relatively unaffected. Indeed, active oxidation of hydrocarbons minimizes the possibility of hydrocarbons accumulation in the catalyst during idle, which can result in hydrocarbon lightoff and exposure of the relatively thermally sensitive zeolite to extreme thermal events (hence accelerated hydrothermal aging). In some embodiments, the first 310 metal oxide catalyst has the ability to facilitate NOx reduction with both hydrocarbon and carbon monoxide serving as reductants; hence, under reduced $NH_3$ conditions (like cold start or when the second 312 metal zeolite catalyst is too cold for diesel exhaust fluid thermolysis), low concentrations of NOx can be processed to comply with emissions standards.

In some embodiments, selective catalytic oxidation makes a considerable contribution to the required hydrocarbon and carbon monoxide oxidation function of the overall aftertreatment system, thereby making it possible to significantly reduce the diesel oxidation catalyst size or the platinum group metal loading. In some embodiments, a platinum group metal-free diesel oxidation catalyst (containing base metals such as Ni, Fe, Cu, Ag, etc.) can be provided; affording significant cost reduction.

In some embodiments, low temperature selective catalytic reduction is achieved based on the first 310 metal oxide catalyst's ability to store not only $NH_3$, but also NO and $O_2$. In this regard, $ZrO_2$-based metal oxides are suitable, particularly for intimate mixing with the second 312 metal-zeolite catalyst.

Sulfur poisoning can be a concern with selective catalytic reduction catalysts in general, both because of the deposit that fouls the surface of the catalyst, but also due to the accelerated aging that results from the repeated thermal treatments required to regenerate and remove the sulfur from the catalyst (which may be in addition to active regeneration for soot oxidation). In some embodiments, the problem is addressed by the high surface concentration of active oxygen species to enhance sulfur resistance provided by the metal oxides (e.g., $ZrO_2$-based metal oxides), and by the enhanced thermal stability of the washcoat composition, due to the presence of substantial amounts of the metal oxide component.

In some embodiments, the loading of the first 310 and second 312 catalysts in the manner and at the locations described herein enable a high capacity for soot loading and retention on the particulate filter core 300, while locating the soot in close proximity to the first 310 catalyst. This configuration supplements locally depleted $NO_2$ and helps to lower the light-off temperature. In some embodiments, a relatively low light-off temperature is important because the low temperature serves to prolong stable operation of the relatively thermally sensitive second 312 catalyst, while facilitating passive regeneration. In some embodiments, the lightoff temperature is less than 500° C. In some embodiments, the lightoff temperature is less than 400° C.

In some embodiments, the spatial arrangement of the first 310 and second 312 catalysts in the internal surface areas of the walls 306 of the core 300 is intended to facilitate localized generation of nitrogen dioxide to effectively ensure that a $NO_2/NOx$ value of about 0.5, for example, may be achieved to favor the fast SCR reaction and achieve high NOx reduction efficiency.

Some embodiments include a high porosity particulate filter substrate 306 with high internal surface area within the walls 306 that will enable high catalyst loading with minimal pressure drop when loaded with soot.

In some embodiments, the first 310 and second 312 catalysts are applied in a manner to effectively reduce the pressure drops in the filter 208. In some embodiments, the pressure drop in the filter 208 is less than 7 kPa at a soot loading of 3 to 4 g/L.

Some embodiments include a selective catalytic reduction catalyst 312 with intrinsic catalytic activity in the absence of $NO_2$ from the diesel oxidation catalyst.

In some embodiments, a catalytic core 300 is provided incorporating selective catalytic reduction and selective catalyst oxidation integrated within a diesel particulate filter 208 for emissions control. In some embodiments, a catalytic core 300 may be monolithic. Monolithic as used herein means a single piece of material. However, monolithic cores can have additional features that do not form the monolithic material.

In some embodiments, the catalytic core 300 can be incorporated in a particulate filter by encasing the core 300 within a suitable metal housing, for example.

In some embodiments, the catalytic, monolithic core 300 is applied in a diesel particulate filter for heavy duty diesel applications, such as Class 8 trucks.

In some embodiments, the catalytic, monolithic core 300 has two catalysts 310, 312 for making nitrogen dioxide and selective catalytic reduction of NOx, respectively. In some embodiments, the catalytic, monolithic core 300 may have a third catalyst for soot oxidation.

In some embodiments, the catalytic core 300 is a high porosity core with high internal surface area within the walls that will enable high catalyst loading with minimal pressure drop when loaded with soot.

In some embodiments, the catalytic core 300 achieves control and reproducibility over the location of catalyst loading in the filter wall.

In some embodiments, the catalytic core 300 has selective catalytic activity in the absence of $NO_2$ from the diesel oxidation catalyst.

Catalysts for the Diesel Oxidation Catalyst Unit 106

Disclosed are representative catalyst compositions for the wall-flow filter/catalytic core 300 when used as a diesel oxidation filter unit 106.

Additional catalyst compositions that can be loaded onto the catalytic core 300 for a diesel oxidation unit are disclosed in the application entitled "Diesel Oxidation Catalyst with Minimal Platinum Group Metal Content," to Randal A. Goffe, U.S. patent application Ser. No. 14/935,001. Catalysts for a diesel oxidation unit include, but are not limited to, a metal oxide comprising a metal element on a metal oxide surface, and less than 10 g/ft$^3$ by weight of Pt or Pd, wherein the diesel oxidation catalyst oxidizes carbon monoxide and hydrocarbons of a diesel exhaust to carbon dioxide and water. In some embodiments, the metal element is selected from Nb, Ca, Sc, Ta, Ti, V, Cr, Mn, Mo, Al, Si, Ge, Ir, Os, Fe, Co, Ni, Cu, Y, Zr, Ru, Rh, Pd, Pt, Ag, Ba, W, La, Ce, and Sr. In some embodiments, the metal element is present in the diesel oxidation catalyst in an amount of from 0.001 to 40% by weight. In some embodiments, the metal oxide particle comprises less than 5 g/ft$^3$ by weight of Pt or Pd. In some embodiments, the metal oxide is selected from cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, nickel oxide, lanthanum oxide, strontium oxide, cobalt oxide, and any combination thereof. In some embodiments, the metal oxide further comprises a cationic dopant selected from $Sr^{2+}$, $Ru^{4+}$, $Rh^{3+}$, $Mg^{2+}$, $Cu^{2+}$, $Cu^{3+}$, $Ni^{2+}$, $Ti^{4+}$, $V^{4+}$, $Nb^{4+}$, $Ta^{5+}$, $Cr^{3+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, and $Nb^{5+}$. In some embodiments, the metal oxide is selected from titanium oxide, zirconium oxide, cerium oxide, and any combination thereof. In some embodiments, the metal oxide further comprises a cationic dopant selected from $Y^{3+}$, $Sc^{3+}$, and $Ca^{2+}$±. In some embodiments, the metal oxide is selected from yttria-stabilized zirconia, yttria-stabilized ceria, and a combination thereof. In some embodiments, the diesel oxidation catalyst is hydrothermally stable when heated for 40 hours at 650° C. In some embodiments, the diesel oxidation catalyst includes a layer of amalgamation between the metal oxide surface and the metal element, wherein the metal oxide and the metal element are intimately mixed.

EXAMPLES

Example 1: First 310 ($NO_2$-Make) Catalyst Screening and Selection

A washcoat composition of 25.6% YSZ-8 (8 mol % yttria, MEL Chemicals); 8.3% YSC-10 (10 mol % yittria, Sigma-Aldrich); 19.9% Nyacol® (Nyacol Nano Technologies); 3.4% PEG/PPG (Sigma-Aldrich); 0.3% PEO (Sigma-Aldrich); and 42.2% DI water was dip coated onto a cordierite (5/300) substrate (available from NGK Automotive Ceramics, U.S.A., Inc.), in the form of 1 inch×1 inch core samples at 30° C., with a vacuum applied to pull excess washcoat through the channel and assist in drying. The washcoat was dried at 105° C. in air and calcined at 450° C. for 1 hr.

Diesel Oxidation Catalyst Lightoff Testing of Catalyst Washcoat on Cordierite Core Samples.

A synthetic gas test bench for testing catalyst core samples was employed to evaluate various catalyst washcoats for their ability to activate undesirable oxidative side reactions. This provides insight into their potential ability to oxidize the $NH_3$ (produced from diesel exhaust fluid dosing). Catalyst-coated core samples were evaluated in an oxidation lightoff experiment. A fresh core sample from a commercial oxidation catalyst was used as a reference.

A gas mixture containing 600 ppm NO; 75 ppm $C_2H_4$; 300 ppm CO; 10% $O_2$; 5.6% $CO_2$; 6% $H_2O$; balance $N_2$; at 60,000 GHSV (gas hourly space velocity) was used to simulate diesel exhaust.

A reverse lightoff test procedure was employed, where the temperature was increased from 160° C. to the setpoint of 600° C., and allowed to stabilize. Heating was then discontinued and both the inlet temperature and the reactor outlet gas concentration were monitored.

Conversion efficiencies were computed and plotted to obtain the temperature at which 50% of the total conversion efficiency was achieved for the conversion of the following species: CO conversion to $CO_2$ ($T_{50}CO$); NO conversion to $NO_2$ ($T_{50}NO$); and $C_2H_4$ conversion to $CO_2$ and $H_2O$ ($T_{50}C_2H_4$).

The results are shown in Table I. The tested catalysts could potentially be employed for the first 310 ($NO_2$-make) catalyst, because they exhibited no capability to activate oxidative lightoff reactions below 500° C. in the absence of a platinum group metal catalytic species.

TABLE I

Lightoff Properties of Redox Catalysts on Cordierite (1" × 1") Core Samples.

| CATALYST | Washcoat Loading (g/L) | $T_{50}CO$ (° C.) | $T_{50}NO$ (° C.) | $T_{50}C_2H_4$ (° C.) |
|---|---|---|---|---|
| Commercial DOC Catalyst (Cu-chabazite) | | 138 | 242 | 247 |
| YSZ-8 | 156 | >600 | N/A | 581 |
| YSZ-8/YSC-10 | 103 | 586 | N/A | 590 |
| YSZ-8/CeO$_2$—ZrO$_2$ | 224 | 550 | N/A | 573 |
| YSC-10 | 43 | 583 | N/A | 592 |

Figure 8:
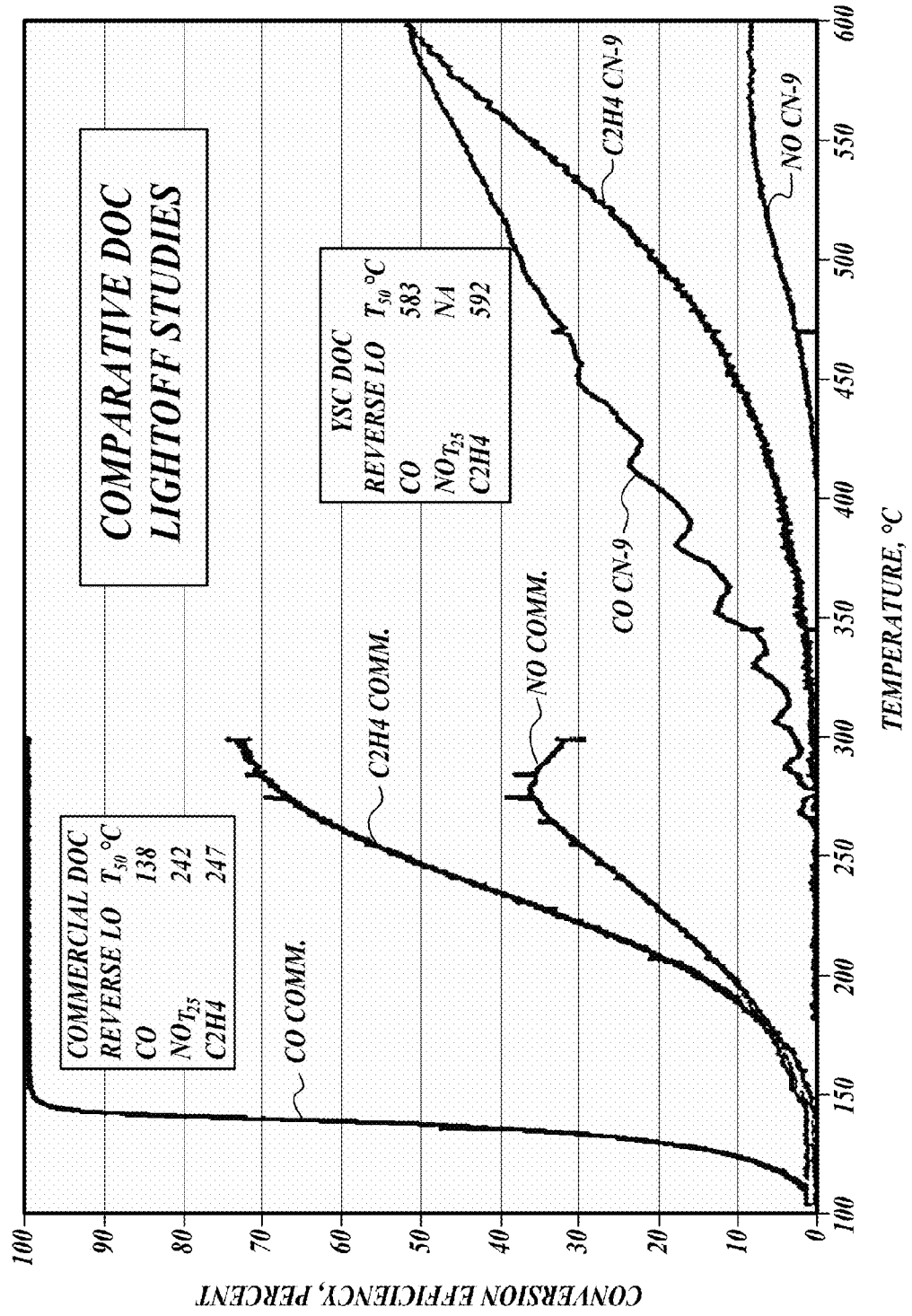
FIG. 8 is a graph of conversion efficiency versus "light-off" temperature for various catalysts.
Figure 9B:
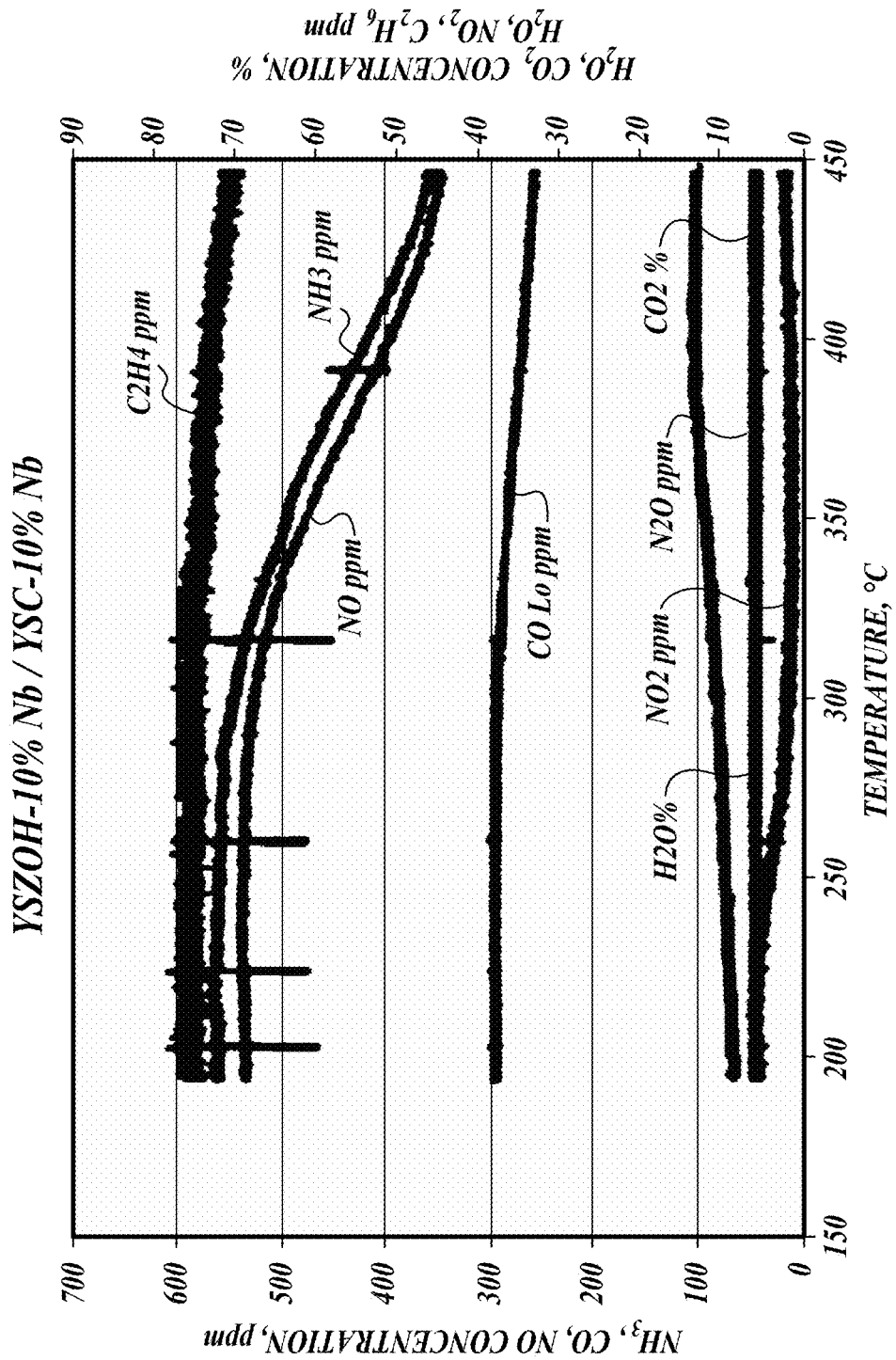
FIG. 9B is a graph showing emissions gas composition versus temperature for a Nb surface modified YSZ/YSC catalyst.
Figure 9C:
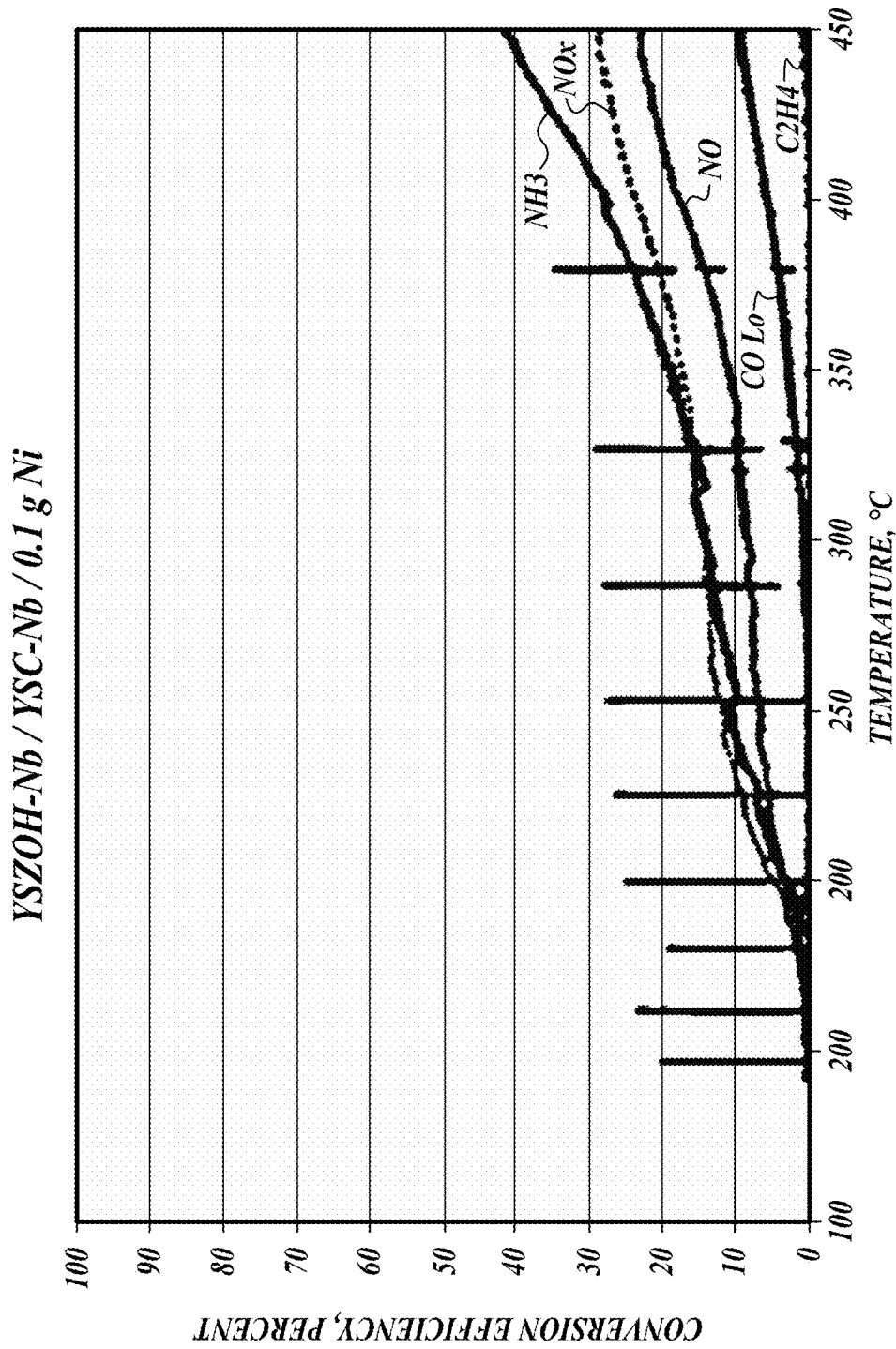
FIG. 9C is a graph showing conversion efficiency percentage versus temperature for a Nb surface modified YSZ/YSC catalyst containing 0.1 g Ni.
Figure 9D:
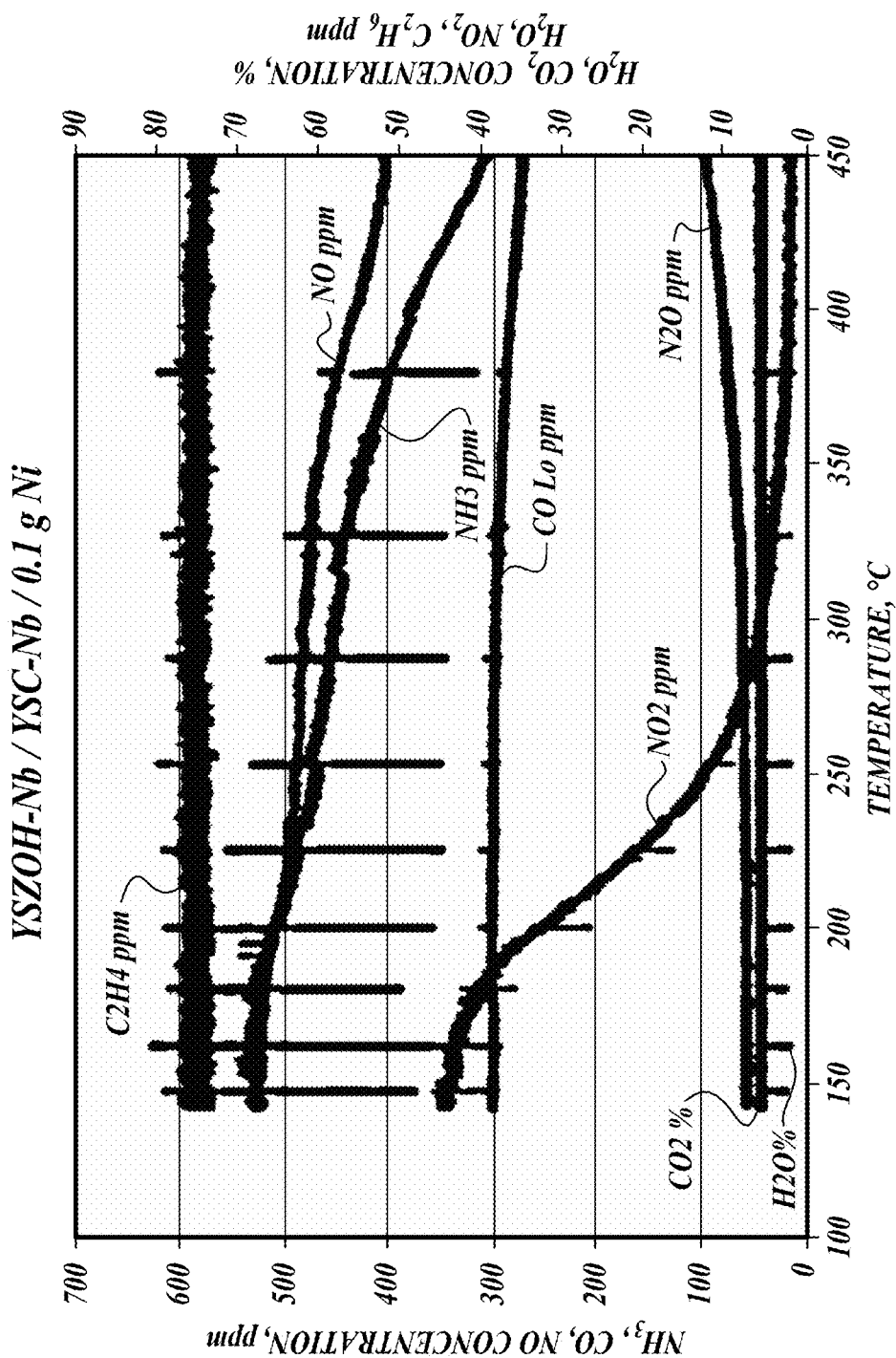
FIG. 9D is a graph showing emissions gas composition versus temperature for a Nb surface modified YSZ/YSC catalyst containing 0.1 g Ni.
Figure 9E:
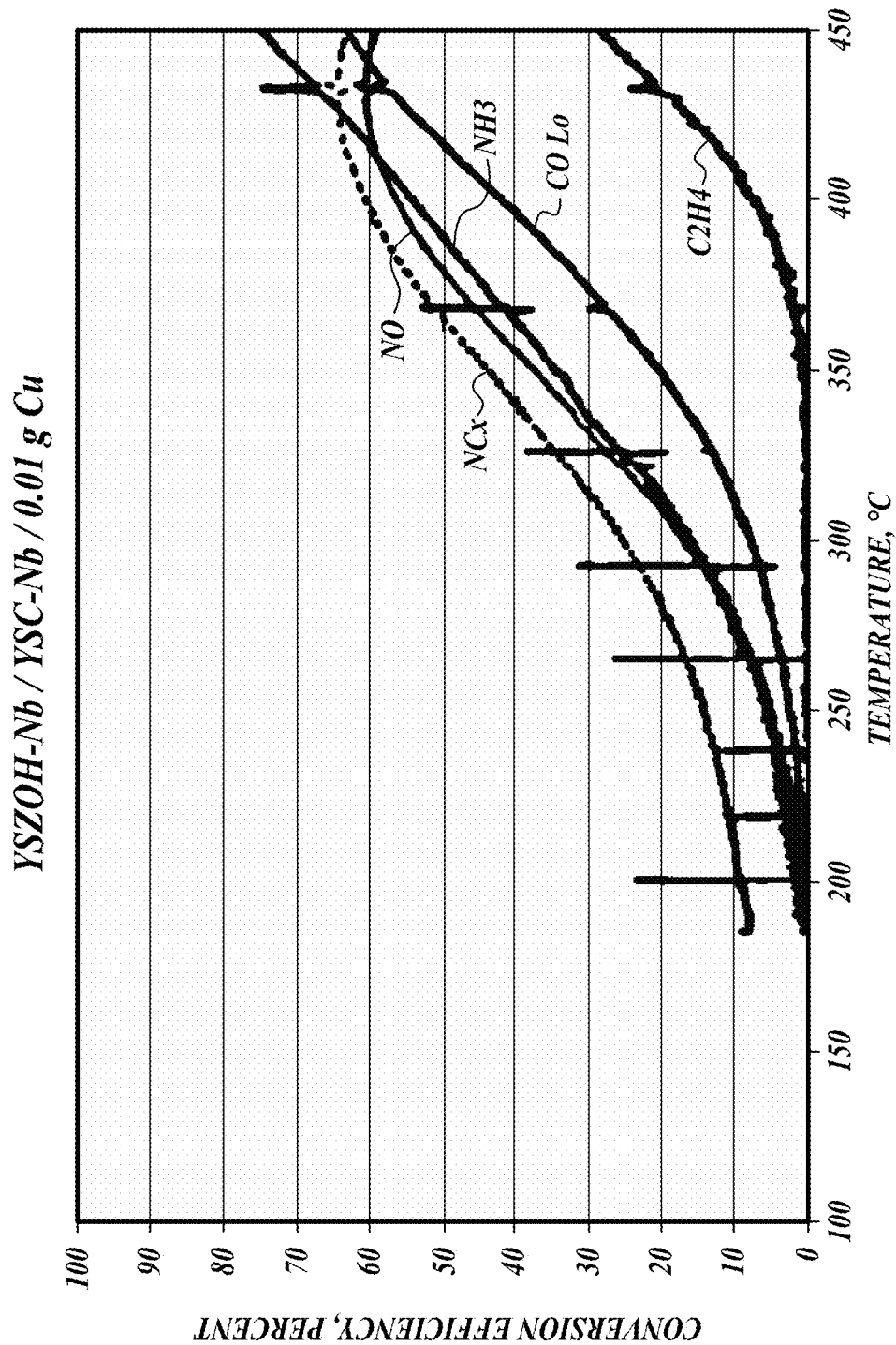
FIG. 9E is a graph showing conversion efficiency percentage versus temperature for a Nb Surface Modified YSZ/YSC catalyst containing 0.01 g Cu.
Figure 9F:
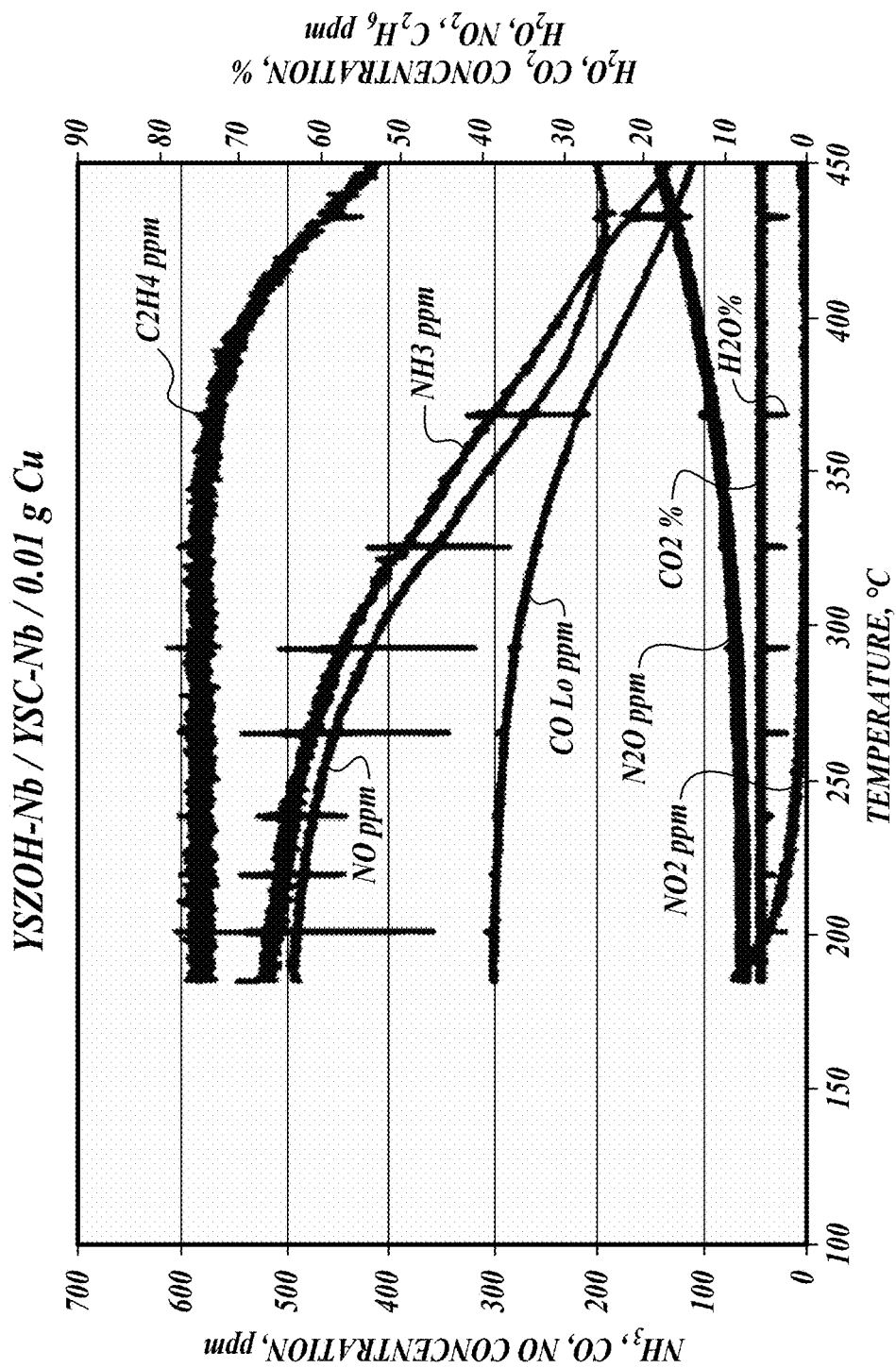
FIG. 9F is a graph showing emissions gas compositions versus temperature for a Nb Surface Modified YSZ/YSC catalyst containing 0.01 g Cu.
Figure 9G:
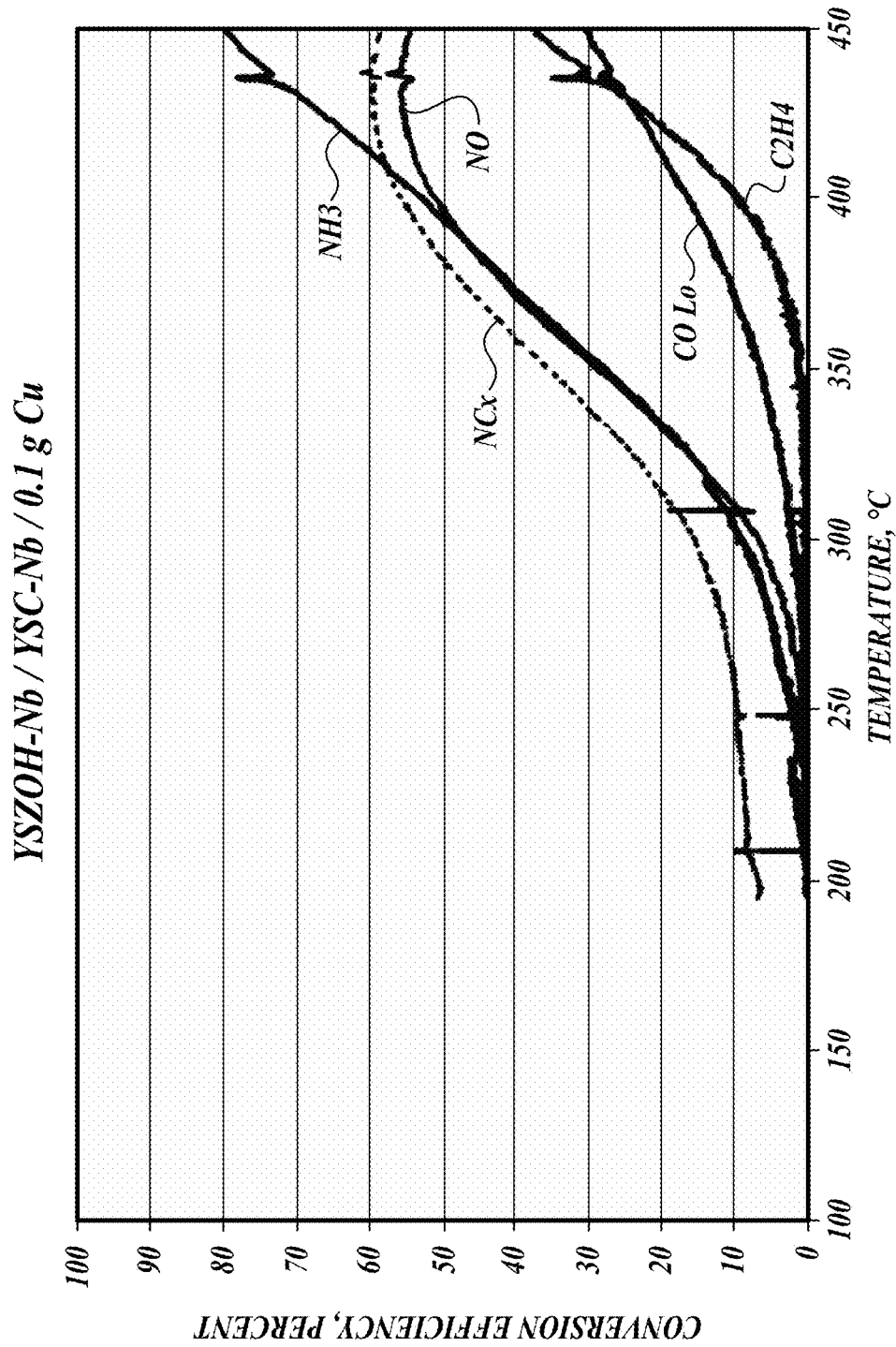
FIG. 9G is a graph showing conversion efficiency percentage versus temperature for a Nb Surface Modified YSZ/YSC catalyst containing 0.1 g Cu.
Figure 9H:
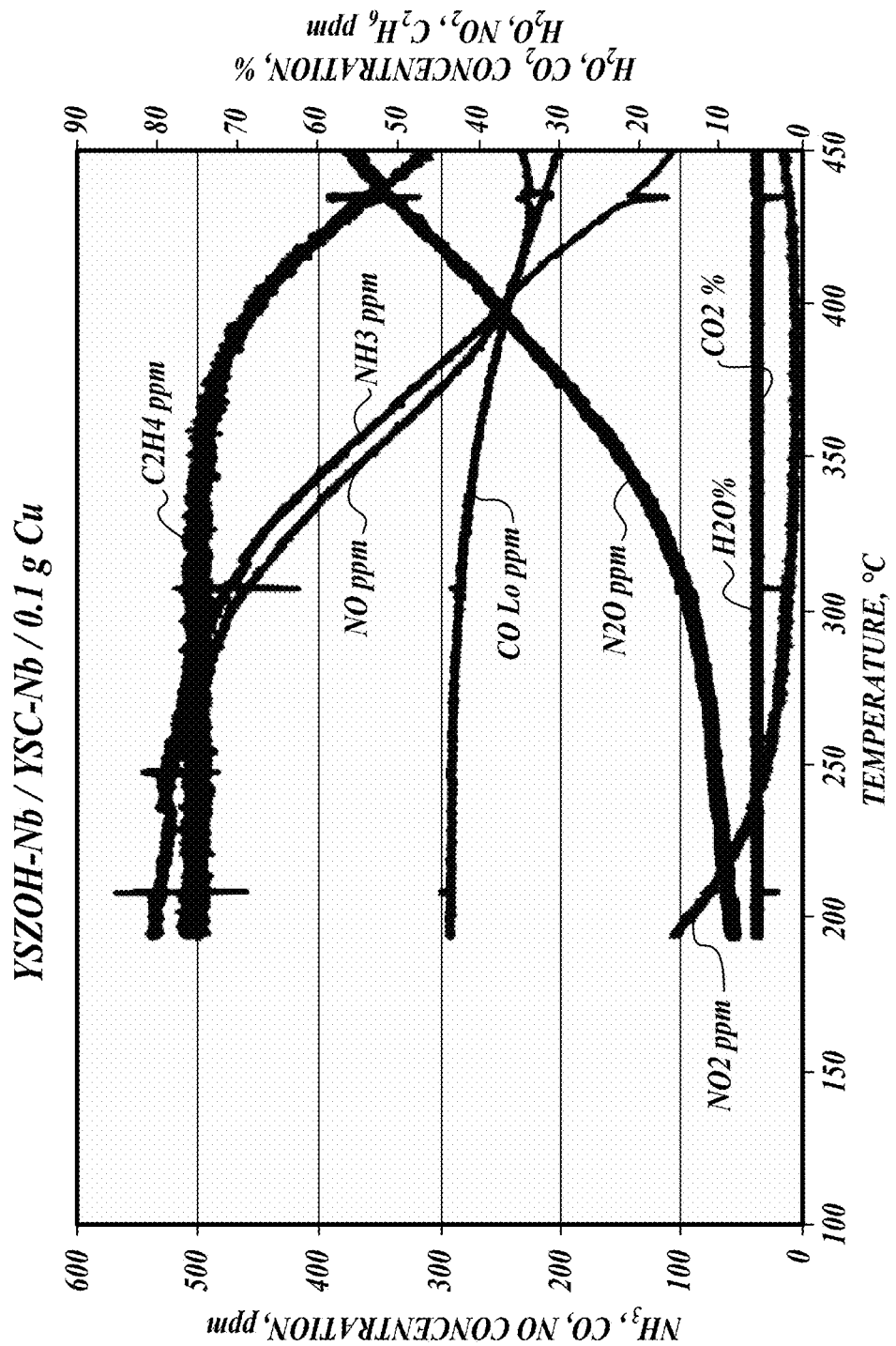
FIG. 9H is a graph showing emissions gas compositions versus temperature and for a Nb Surface Modified YSZ/YSC catalyst containing 0.1 g Cu.

FIG. 8 (FIG. 5 of paper) is a graphic representation of the relative performance of a commercial oxidation catalyst containing a platinum group metal and the yttria stabilized ceria (YSC-10) catalyst.

In some embodiments, the first 310 catalyst is selected from the metal oxides which exhibits the least oxidative power, and as such will be the least likely to oxidize $NH_3$, while enabling the reaction and stabilization of $NO_2$ to facilitate high NOx reduction in $NO_2$ depleted exhaust streams. Therefore, based upon these results, in some embodiments, the first 310 catalysts are preferred in the order: YSZ>YSC>>$CeO_2$—$ZrO_2$.

Example 2: Base Metal Modified First 310 Metal Oxide Catalysts

Two component metal oxide catalysts on cordierite core samples (1 inch×1 inch) with the washcoat composition from Example 1, were tested. The catalysts included:
1. 70% by weight YSZOH-10% Nb and 30% by weight YSC-10% Nb.
2. 70% by weight YSZOH-Nb and 30% by weight YSC-Nb and 2% by weight Ni (0.1 g Ni) (2% by weight of the total catalyst loaded in Catalyst Composition No. 1).
3. 70% by weight YSZOH-Nb and 30% by weight YSC-Nb and 2% by weight Cu (0.1 g. Cu) (1% by weight of the total catalyst loaded in Catalyst Composition No. 1).
4. 70% by weight YSZOH-Nb and 30% by weight YSC-Nb and 0.2% by weight Cu (0.01 g. Cu) (0.2% by weight of the total catalyst loaded in Catalyst Composition No. 1).

The OH in YSZOH signifies the hydroxide form instead of the oxide form, i.e., 8 mol % yttrium stabilized zirconium hydroxide. To convert to the oxide form, the OH form is calcined at 1,000° C. for 3 hours. The OH form was used in surface modification processes due to the abundance of the more chemically reactive OH groups compared with surface oxide species. Calcining during the surface modification process and calcining of the final catalyst washcoat will convert residual unreacted OH groups to oxide.

YSZOH is an 8 mol % yttrium stabilized zirconium hydroxide (YSZOH-8), and YSC is a 10 mol % yttrium stabilized ceria (YSC-10).

Each of the metal oxide catalyst precursors was surface modified with Nb (10% by weight). Washcoats were prepared from these surface modified catalysts and core samples were tested for NOx reduction efficiency according to the reverse lightoff ($NO_2$-free) protocol with the following gas stream composition: 600 ppm NO; 600 ppm $NH_3$; 75 ppm $C_2H_4$; 300 ppm CO; 10% $O_2$; 5.6% $CO_2$; 6% $H_2O$; balance $N_2$; at 40,000 GHSV.

Post-fabrication treatment of selected core samples with different amounts of either Cu or Ni salts was performed, followed by calcining (at 450° C. for 1 hr.). The results are shown in FIGS. 9A, 9B, 9C, 9D, 9E, 9F, 9G, and 9H:

These data demonstrates several features.
1. NOx reduction efficiency under $NO_2$-free conditions is enhanced.
2. In the case of Ni, both low temperature NOx reduction efficiency and $NH_3$ storage over the entire temperature range are enhanced, while there is a slight decline in high temperature NOx reduction efficiency.
3. For copper, only high temperature NOx reduction efficiency is enhanced.
4. Nickel suppresses all oxidative processes markedly, including: HC, CO and $NH_3$ (with even somewhat of a reduction in $N_2O$ levels).
5. By way of contrast, Cu exhibits a pronounced concentration dependent increase in all oxidative processes, with $NH_3$ oxidation to $N_2O$ being particularly dramatic.

Based upon this data set, it can be concluded that Ni is a useful cationic modifier for these catalysts.

Example 3: Selective Catalytic Reduction Filter Evaluation on High Porosity Silicon Carbide Wall-Flow Filters Table II contains a summary of the composition of (1 inch×3 inch) core samples of HP silicon carbide filters that were coated with a catalyst washcoat and tested for particulate filtration combined with selective catalytic reduction functionality including: NOx reduction (i.e., conversion) efficiency to evaluate selective catalytic reduction function with and without soot, pressure differential as a function of soot loading, and soot lightoff temperature.

Two catalysts were applied in two separate layers except for Sample 26. The second layer contained 81% CuZSM-5 and 19% nano-particle sized $ZrO_2$ (in the form of Nyacol). Thus, the second layer is a mixture of metal oxide and metal zeolite in each core sample preparation. Item 2, Sample 26, has a single layer.

TABLE II

Combined Particulate Filter and Selective Catalytic Reduction Core Sample Compositions

| ITEM # | SAMPLE PREP # | First Layer (310) $NO_2$ MAKE YSC CATALYST (g/L) | METAL TYPE | Second Layer (312) SCR CATALYST CuZSM-5 (g/L) | TOTAL CATALYST (g/L) | Application |
|---|---|---|---|---|---|---|
| 1 | 17 | 16.2 | None | 96.3 | 112.5 | SCRF |
| 2 | 26 | None | None | 75 | 75 | SCRF |
| 3 | 6 | 47.8 | Fe | 94.9 | 142.7 | Base Metal DOC |
| 4 | 11 | 24.2 | Ag | 62.4 | 86.6 | Base Metal DOC |
| 5 | 19 | 42 | Pd | 74.8 | 116.8 | PGM DOC |
| 6 | 4 | 38.5 | Cu-1 | 53.7 | 92.2 | Base Metal DOC |
| 7 | 5 | 36.8 | Cu-2 | 63.2 | 101.8 | Base Metal DOC |
| 8 | 9 | 75.1 | Ni | 76.2 | 151.3 | Base Metal DOC |

TABLE II-continued

Combined Particulate Filter and Selective Catalytic Reduction
Core Sample Compositions

| ITEM # | SAMPLE PREP # | First Layer (310) NO$_2$ MAKE YSC CATALYST (g/L) | METAL TYPE | Second Layer (312) SCR CATALYST CuZSM-5 (g/L) | TOTAL CATALYST (g/L) | Application |
|---|---|---|---|---|---|---|
| 9 | 13 | 21.3 | Pt | 56.8 | 78.1 | PGM DOC |
| 10 | 12 no data | 19.8 | Pd | 68.3 | 88.1 | PGM DOC |

Core Sample Preparation:

Silicon carbide core samples were dip coated with the vacuum aided technique described in Example 1, from the downstream side of the filter only.

Washcoat compositions were prepared as follows:

Optionally apply first washcoat: 5.8% Yttria stabilized ceria (10 mol %), 12.2% PEG-PPG (Mn~2,500), both from Sigma Aldridge, with 8.8% NYACOL ZR 10/15 (ZrO$_2$, Nano Technologies Inc), and 73.2% ID water, then dried at 105° C. for 1 hr.

Optionally treat with 1M (CuSO$_4$, FeCl$_3$, AgNO$_3$, or NiSO$_4$) or, dilute PdCl$_2$ or PtCl$_2$ solutions, followed by 0.3M Na formate and dried at 105° C. for 1 hr., then, calcined at 450° C. for 1 hr.

Apply second washcoat: 27% CuZSM-5 (from ACS as nanoZSM-5), 1.8% PEG-PPG, 10.8% NYACOL ZR 10/15, 0.8% PEG (300,000) and 58.9% DI water. Drying was conducted at 105° C. and calcining at 450 for 1 hr.

Standard pretesting (degreening) procedure for all samples: 4 hr. at 600° C. with 10% H$_2$O vapor.

Core Sample Testing Sequence:
1. Clean ΔP—with no soot in the filter.
2. Clean NOx reduction efficiency: NO$_2$/NOx=0.5, NH$_3$/NOx=1, 500 ppm NOx, at 35,000 GHSV.
3. ΔP verses collected soot
4. NOx reduction efficiency with soot (same conditions as step 2)
5. Temperature programmed oxidation of soot; i.e., soot lightoff temperature.

Figure 10:
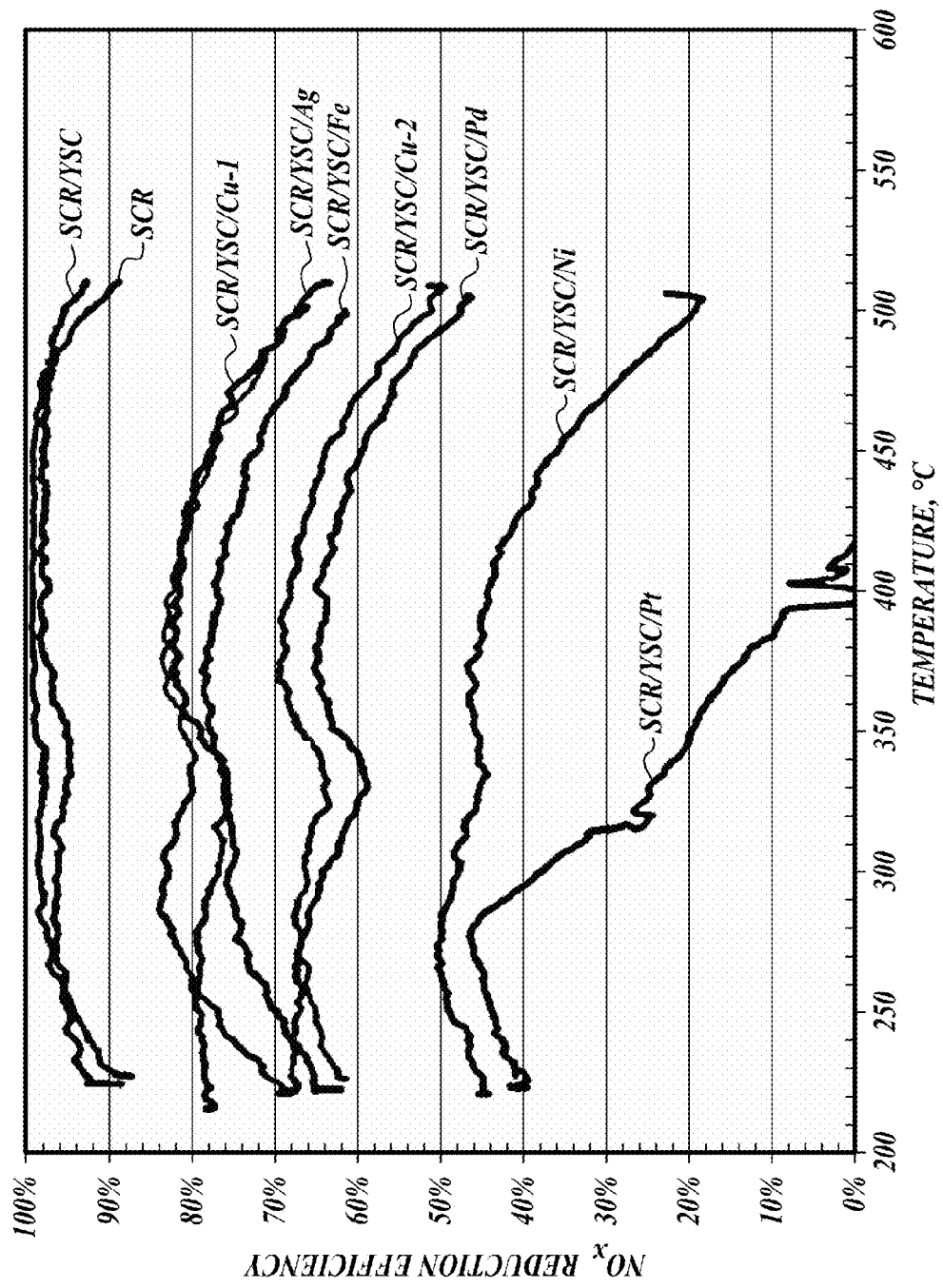
FIG. 10 is a graph of NOx reduction efficiency versus temperature of core samples without soot for various catalysts.

The results without soot are shown in FIG. 10. This data demonstrates the following:

The 81% CuZSM-5/19% nano-ZrO$_2$ catalyst (i.e. SCR in FIG. 10, Item 2, Sample 26) provides high NOx conversion efficiency for both low and high temperature conditions.

The binary catalyst (SCR/YSC in FIG. 10) has similar high performance and apparent durability of the SCR catalyst (in FIG. 10).

Treatment of the YSC layer with a platinum group metal and a variety of base metals prior to application of the SCR washcoat has produced a range of NOx reduction efficiency consistent with the catalytic properties of the metal in redox reactions. Consequently, with the greater oxidative power of Pt, for example, there is a dramatic decline in NOx reduction efficiency primarily due to the excessive NO$_2$, combined with NH$_3$ oxidation, to produce large amounts of N$_2$O (FIG. 10).

The behavior of Ni and Pd reflects their use in selective oxidation and reduction processes (respectively) in electrochemical applications. Ni is particularly interesting because it demonstrates a uniquely low N$_2$O selectivity over the entire temperature range of about 230-530° C. (FIGS. 9E, 9F, 9G, and 9H).

The behavior of the base metals (Cu and Fe), as well Ag is more complex and exemplifies the tradeoff between a number of properties, including selective catalytic oxidation properties, low vs high temperature NOx reduction efficiency, thermal stability, required loading levels, and process costs.

In some embodiments, the preferred cation treatment of the YSC layer in order to have the ability to simultaneously achieve optimal NOx reduction efficiency (with in situ NO$_2$-make) and minimal N$_2$O from NH$_3$ oxidation is as follows: Ni>Ag>Cu, Fe>Pd>Pt.

Figure 11:
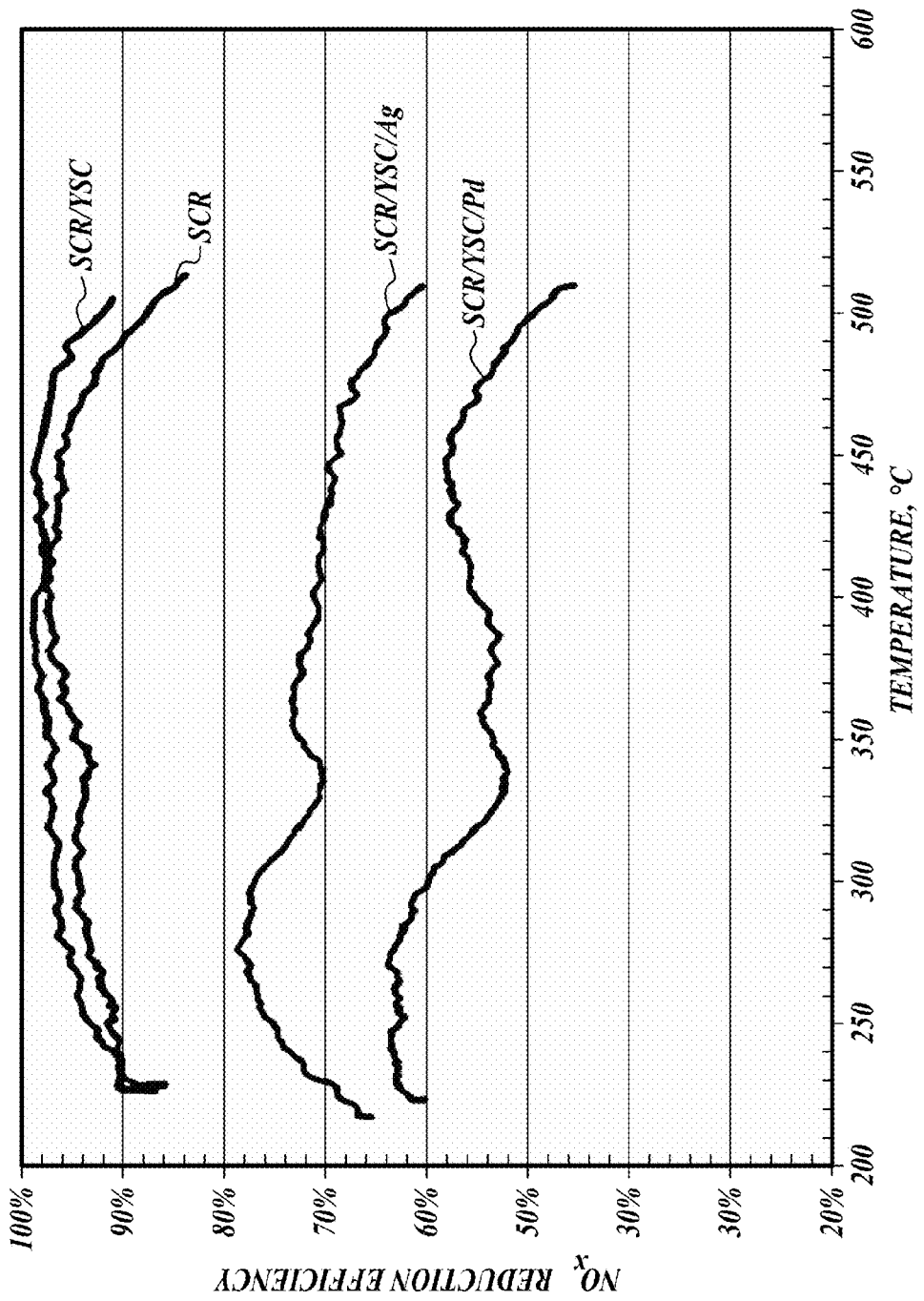
FIG. 11 is a graph of NOx reduction efficiency versus temperature of core samples with soot for various catalysts.

The results with soot are shown in FIG. 11. The impact of (3 g/L) of soot loading on NOx conversion efficiency of the binary first 310 and second 312 catalysts is quite different from that for a conventional catalyst, as shown in Tables III and IV. This data illustrates the fact that incorporation of a first 310 catalyst into the washcoat improves low temperature NOx reduction efficiency over conventional SCRF technology both in the absence and presence of soot. The same conclusion is drawn when comparing NOx reduction efficiency across the entire operating temperature range for the engine aftertreatment system.

In Tables III and IV, the conventional SCRF catalyst is Cu-chabazite and the binary SCRF catalyst is 81% CuZSM-5/19% nano-ZrO$_2$, (i.e. "SCR" in FIG. 10, item 2, sample 26).

TABLE III

Effect of Soot Loading and Temperature on NOx Reduction Efficiency

| State of DPF Loading | CONVENTIONAL SCRF | | BINARY CATALYST SCRF | |
|---|---|---|---|---|
| | 230° | 500° C. | 230° C. | 500° C. |
| Nil | 80% | 75% | 90% | 93% |
| Soot (3-4 g/L) | 85% | 75% | 90% | 87% |

TABLE IV

Effect of Soot & Temperature on N$_2$ Selectivity in NH$_3$ Oxidation - Reported as N$_2$O-Make

| State of DPF Loading | CONVENTIONAL SCRF | | BINARY CATALYST SCRF | |
|---|---|---|---|---|
| | 230° | 500° C. | 230° C. | 500° C. |
| Nil | 37 ppm | 9 ppm | 19 ppm | ~1 ppm |
| Soot (3-4 g/L) | 13 ppm | 7 ppm | 15 ppm | 5 ppm |

TABLE V

Effect of Catalyst Composition on Onset of Soot Lightoff Temperature

| Item | Sample ID | SCRF Catalyst Composition | Source | Onset of Soot Lightoff (° C.) |
|---|---|---|---|---|
| 1 | Control | Cu-Chabazite on Cordierite DPF | Commercial | 345 |
| 2 | SCR | CuZSM-5/$ZrO_2$ on Hi SiC DPF | In-house Fabrication | 345 |
| 3 | SCR/YSC | Binary Catalyst: CuZSM-5/$ZrO_2$/YSC on Hi SiC | In-house Fabrication | 362 |
| 4 | SCR/YSC-Pd | Binary Catalyst: CuZSM-5/$ZrO_2$/YSC-Pd on Hi SiC | In-house Fabrication | 350 |
| 5 | SCR/YSC-Ag | Binary Catalyst: CuZSM-5/$ZrO_2$/YSC-Ag on Hi SiC | In-house Fabrication | 361 |
| 6 | Blank | Hi SiC (65% porosity) | Commercial | 360 |

Effect of Soot Loading on ΔP

The following is the ΔP after the initial phase of soot loading for the core samples tested (the sample numbers are from Table II above):

Sample 26—ΔP~1.6 kPa @ 0.1 g/L
Samples 5 and 11 are similar to Sample #26
Sample 19—ΔP~7.2 kPa @ 0.2 g/L
Sample 17—ΔP~1.6 kPa @ 0.05 g/L
Comparative conventional—ΔP~7.4 kPa @ 3.6 g/L This data illustrates the capability to accomplish optimal catalytic performance with reduced ΔP.

Example 4: $NO_2$-Free Gas Stream Testing of High Performance Selective Catalytic Reduction Catalyst on Particulate Filter This example demonstrates the role of the first 310 ($NO_2$-make) catalyst on diesel particulate filter substrates; where the core sample 26 (Table II, Example 2), was tested for NOx reduction efficiency by the reverse lightoff method with the following gas stream: 600 ppm NO; 600 ppm $NH_3$; 75 ppm $C_2H_4$; 300 ppm CO; 10% $O_2$; 5.6% $CO_2$; 6% $H_2O$; balance $N_2$ at 40,000 GHSV.

Figure 12A:
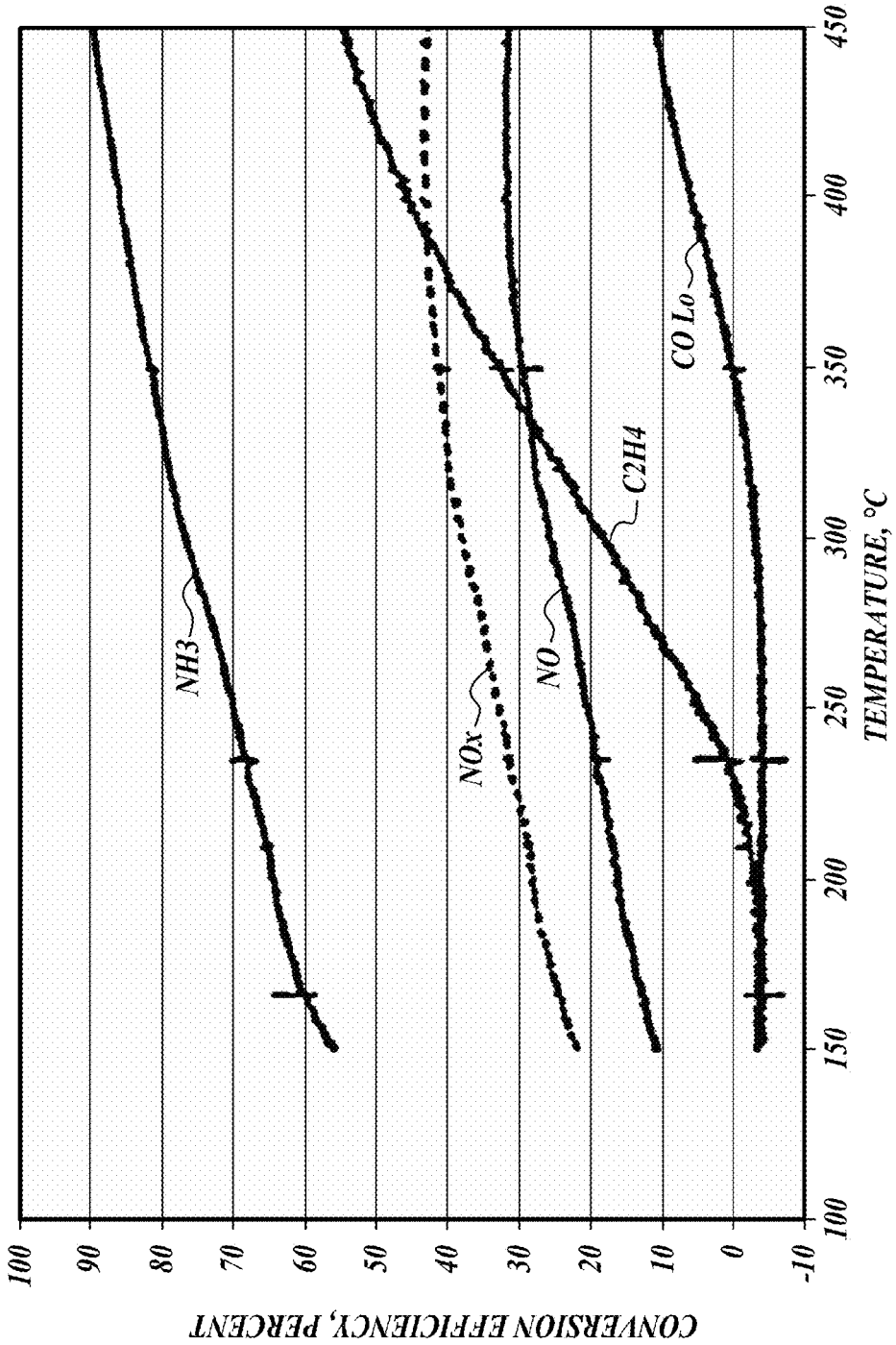
FIG. 12A is a graph of conversion efficiency percentage versus temperature of an NO-only gas stream for a selective catalytic reduction catalyst.
Figure 12B:
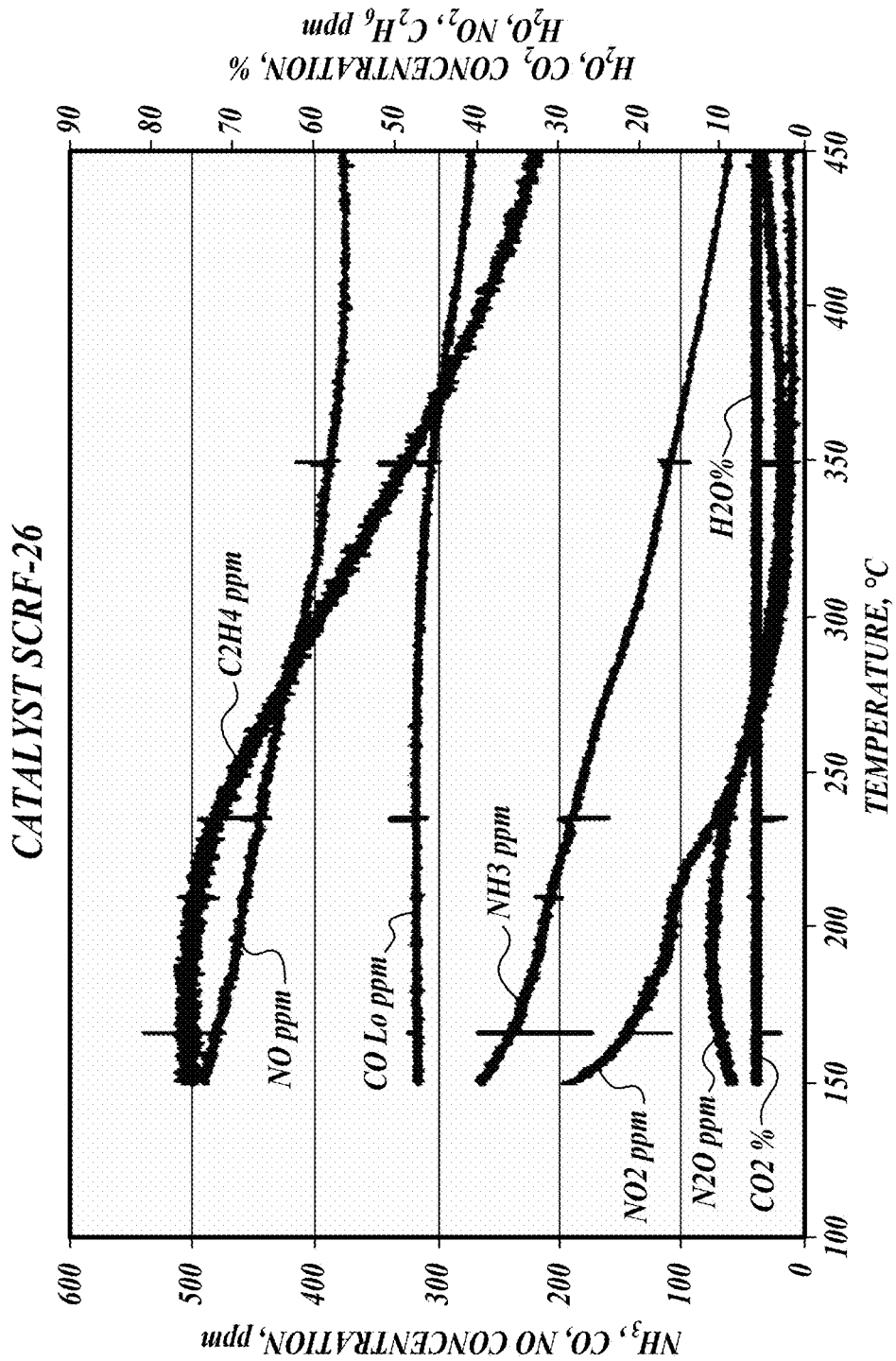
FIG. 12B is graph of the gas composition versus temperature of an NO-only gas stream for a selective catalytic reduction catalyst.

The results are shown in FIGS. 12A and 12B. The data demonstrates the following:

1. NOx reduction efficiency in the absence of $NO_2$ occurs at an unexpectedly high level.
2. Low temperature NOx reduction efficiency is improved.
3. The low temperature selective catalytic reduction performance is directly linked (at least in part) with high $NH_3$ storage; as illustrated by the difference between the $NH_3$ and NOx conversions in the data in FIG. 12A.
4. Selective oxidation of HC and CO is at a very low level, and $NH_3$ is relatively unaffected; as determined by the relatively low $N_2O$ detected in the emissions gas.

Example 5: Symmetric Vs Asymmetric Distribution of Catalyst Loading

A procedure to produce a generally symmetrically distributed catalyst on a wall-flow filter monolithic core was developed. Catalyst washcoat compositions including, 83.8% CuZSM-5, 16.2% nano-particulate $ZrO_2$ (in the form of NYACOL ZR 15/10), were formulated as described in Example 3 and applied to (1 inch×3 inch) silicon carbide substrate cores. The method of washcoat application was varied in a manner to produce asymmetric vs symmetric catalyst distribution.

Symmetrical Washcoat Distribution

1. Fill and empty channels and walls with several volumes of DI water. High vacuum was applied for over 60 seconds to remove all bulk water from the channels and pores, leaving only the completely wetted surfaces of the internal wall pores and channel walls.
2. Fill the exit channels of the monolith substrate with a low viscosity washcoat slurry and allow the slurry to flow through the pore structures on the pre-wetted surfaces (with minimal frictional resistance), under gravity flow or very low vacuum.
3. When bulk liquid was observed emerging from the entrance channels, a high vacuum was applied to remove the (almost optically clear) bulk water and enable the solids in the washcoat to adhere symmetrically throughout the internal surfaces simultaneously.
4. Steps 2-3 were repeated until the bulk liquid that was removed under high vacuum appears markedly cloudy with slurry components, signifying that all surfaces had been coated with a thin layer of washcoat in a generally symmetrical distribution.

Asymmetrical Washcoat Distribution

1. After adding several volumes of DI water to the exit channels of the monolith substrate, a high vacuum was briefly applied to remove only the bulk water in the channels. This ensured that the pore walls remained substantially filled with DI water, thus creating a lower solids concentration difference between the slurry in the pores compared with the washcoat slurry remaining in the channels. This forms the basis for the asymmetry in washcoat distribution for the start of the first batch of applied washcoat.
2. The multistep washcoat slurry addition procedure described previously was employed, but from the outset, a cloudy liquid was observed emerging from the entry channels when a high vacuum was applied. By applying the same total amount of washcoat slurry for all sample preparations, comparable washcoat loadings were ensured, independent of its relative distribution in the monolith substrate wall.

The asymmetric method for applying washcoat did not pre-wet the internal surfaces, which meant that frictional forces between the slurry and the dry pore wall surfaces prevents free flow out the entire pore structure before adsorption of the solids to the surface occurs. This results in asymmetrical distribution of washcoat in the substrate walls.

Also, pre-wetting the substrate with aqueous or non-aqueous solutions can be employed to modulate and control the symmetrical distribution.

FIG. 7 shows differences in physical appearance in loading approximately the same amount of catalyst in an asymmetric distribution (left pane) compared with a more symmetric distribution (right pane) which consequently leads to differences in the ΔP.

It is seen that the asymmetrical distribution exit flow channels in the monolith are of significantly reduced diameter. The consequence of this will be both higher ΔP and the potential for diffusion limitation of reactant(s) and product(s) to become rate limiting.

While illustrative embodiments have been illustrated and described, it will be appreciated that various changes can be made therein without departing from the spirit and scope of the invention.

The embodiments of the invention in which an exclusive property or privilege is claimed are defined as follows:

1. A catalytic core for a wall-flow filter, comprising:
   a plurality of juxtaposed channels extending longitudinally between an inlet side and an outlet side of the catalytic core, wherein inlet channels are plugged at the outlet side and outlet channels are plugged at the inlet side;

longitudinal walls forming the inlet and outlet channels, wherein the walls separate the inlet channels from the outlet channels, wherein the walls comprise pores creating passages extending across a width of the walls from the inlet channels to the outlet channels; and a first and second catalyst, wherein each catalyst is distributed across the width and length of the walls within internal surfaces of the pores, wherein a loading of each catalyst across the width varies by less than 50% from an average loading across the width, wherein the first catalyst comprises a metal oxide catalyst and the second catalyst comprises a metal zeolite catalyst, and wherein the catalytic core further has at least one catalyst feature selected from the group consisting of:

the metal zeolite catalyst comprises iron, copper, or any combination thereof;

the metal oxide catalyst is applied over a third cerium-based catalyst;

the metal oxide catalyst comprises from 0.1% to 80% by weight of a combined weight of the first and second catalysts;

the metal oxide catalyst does not include a platinum group metal; and the first catalyst and the second catalyst are a mixture comprising 19% by weight nano-$Zr_2O$ and 81% by weight CuZSM-5.

2. The catalytic core of claim 1, wherein the loading of each catalyst across the width varies by less than a value selected from the group consisting of 40% and 30%.

3. The catalytic core of claim 1, wherein each catalyst is distributed on the internal pore surfaces of the walls within a weight percent range selected from the group consisting of greater than 80% by weight, greater than 70% by weight, greater than 60% by weight, and greater than 50% by weight.

4. The catalytic core of claim 1, wherein each catalyst is distributed on external wall surfaces of the outlet channels within a weight percent range selected from the group consisting of less than 20% by weight, less than 30% by weight, less than 40% by weight, and less than 50% by weight.

5. The catalytic core of claim 1, wherein a porosity of the walls is greater than a porosity selected from the group consisting of 60%, 50%, and 40%.

6. The catalytic core of claim 1, comprising a material selected from the group consisting of a ceramic, a metal, silicon carbide, cordierite, and aluminum titanate.

7. The catalytic core of claim 1, wherein the pores have a mean pore size in a size range selected from the group consisting of 5 microns to 50 microns, 10 to 30 microns, and 10 to 20 microns.

8. The catalytic core of claim 1, wherein the core comprises a cell density in a range selected from the group consisting of 100 to 500 cells per inches squared, and 100 to 300 cells per inches squared.

9. The catalytic core of claim 1, wherein a pore volume of pores greater than 100 microns is less than a value selected from the group consisting of 30%, 20%, and 10%.

10. The catalytic core of claim 1, wherein an average thickness of the walls is in a range selected from the group consisting of less than 2 millimeters, less than 1 millimeter, and less than 0.5 millimeter.

11. The catalytic core of claim 1, wherein at least the inlet and outlet channels comprise a monolithic material.

12. The catalytic core of claim 1, wherein the metal oxide catalyst comprises a material selected from the group consisting of zirconia, ceria, yttria, yttria-stabilized zirconia, and yttria-stabilized ceria, or a combination thereof.

13. The catalytic core of claim 1, wherein the metal oxide catalyst further comprises copper, iron, nickel, silver, palladium, platinum, niobium, vanadium, titanium, manganese, barium, scandium, calcium, lanthanum, cobalt, chromium, or any combination thereof.

14. The catalytic core of claim 1, wherein the first catalyst is distributed in a first layer, and the second catalyst is distributed in a second layer different than the first layer.

15. The catalytic core of claim 1, wherein the metal oxide catalyst is applied first and the metal zeolite catalyst is applied second.

16. The catalytic core of claim 1, wherein the first and second catalysts are distributed within a same layer.

17. The catalytic core of claim 1, wherein the first catalyst comprises a metal oxide catalyst and the second catalyst comprises a metal zeolite catalyst mixed within a single layer.

18. The catalytic core of claim 1, wherein the metal oxide catalyst comprises about 100% by weight of a metal oxide.

19. The catalytic core of claim 1, wherein the metal zeolite catalyst comprises 50% by weight or less of a base metal.

20. The catalytic core of claim 1, wherein the metal oxide catalyst includes a platinum group metal.

21. The catalytic core of claim 1, wherein the loading of the first and second catalyst is each about 20 grams/liter to 150 grams/liter.

22. The catalytic core of claim 1, wherein the one or more catalysts comprise a metal oxide comprising a metal element on a metal oxide surface, and less than 10 $g/ft^3$ by weight of Pt or Pd.

23. The catalytic core of claim 1, wherein the metal oxide is selected from the group consisting of cerium oxide, titanium oxide, zirconium oxide, aluminum oxide, silicon oxide, hafnium oxide, vanadium oxide, niobium oxide, tantalum oxide, chromium oxide, molybdenum oxide, tungsten oxide, ruthenium oxide, rhodium oxide, iridium oxide, nickel oxide, lanthanum oxide, strontium oxide, and cobalt oxide, or any combination thereof.

24. The catalytic core of claim 1, wherein the metal oxide comprises a metal element selected from the group consisting of Nb, Ca, Sc, Ta, Ti, V, Cr, Mn, Mo, Al, Si, Ge, Ir, Os, Fe, Co, Ni, Cu, Y, Zr, Ru, Rh, Pd, Pt, Ag, Ba, W, La, Ce, and Sr.

25. A catalytic core for a wall-flow filter, comprising:

a plurality of juxtaposed channels extending longitudinally between an inlet side and an outlet side of the catalytic core, wherein inlet channels are plugged at the outlet side and outlet channels are plugged at the inlet side;

longitudinal walls forming the inlet and outlet channels, wherein the walls separate the inlet channels from the outlet channels, wherein the walls comprise pores creating passages extending across a width of the walls from the inlet channels to the outlet channels; and one or more catalysts, wherein each catalyst is distributed across the width and length of the walls within internal surfaces of the pores, wherein a loading of each catalyst across the width varies by less than 50% from an average loading across the width, wherein the one or more catalysts comprise a metal oxide catalyst with cationic dopants.

26. The catalytic core of claim 25, wherein the cationic dopants is selected from the group consisting of $Sr^{2+}$, $Ru^{4+}$, $Rh^{3+}$, $Mg^{2+}$, $Cu^{2+}$, $Cu^{3+}$, $Ni^{2+}$, $Ti^{4+}$, $V^{4+}$, $Nb^{4+}$, $Ta^{5+}$, $Cr^{3+}$, $Mo^{3+}$, $W^{6+}$, $W^{3+}$, $Mn^{2+}$, $Fe^{3+}$, $Zn^{2+}$, $Ga^{3+}$, $Al^{3+}$, $In^{3+}$, $Ge^{4+}$, $Si^{4+}$, $Co^{2+}$, $Ni^{2+}$, $Ba^{2+}$, $La^{3+}$, $Ce^{4+}$, and $Nb^{5+}$.

27. A particulate filter, comprising:
   at least one inlet channel;
   at least one outlet channel;
   a wall separating the inlet channel from the outlet channel; and
   one or more catalysts, each catalyst being distributed across the width and length of the wall within internal surfaces of the wall, wherein a loading of each catalyst across the width varies by less than 50% from an average loading across the width, wherein the particulate filter comprises a first and second catalyst, wherein the first catalyst is configured to make nitrogen dioxide, and the second catalyst is configured to reduce NOx species to nitrogen.

28. The particulate filter of claim 27, wherein the catalyst is configured to oxidize hydrocarbons and carbon monoxide.

29. A catalytic core for a wall-flow filter, comprising:
   a plurality of juxtaposed channels extending longitudinally between an inlet side and an outlet side of the catalytic core, wherein inlet channels are plugged at the outlet side and outlet channels are plugged at the inlet side;
   longitudinal walls forming the inlet and outlet channels, wherein the walls separate the inlet channels from the outlet channels, wherein the walls comprise pores creating passages extending across a width of the walls from the inlet channels to the outlet channels; and
   a first and second catalyst, wherein each catalyst is distributed across the width and length of the walls within internal surfaces of the pores, wherein a loading of each catalyst across the width varies by less than 50% from an average loading across the width, wherein the first catalyst is configured to make nitrogen dioxide, and the second catalyst is configured to reduce NOx species to nitrogen.

* * * * *